(12) United States Patent
Feldkamp et al.

(10) Patent No.: US 9,625,903 B2
(45) Date of Patent: Apr. 18, 2017

(54) DATA LINK FOR USE WITH COMPONENTS OF REMOTE CONTROL VEHICLES

(71) Applicant: CASTLE CREATIONS, INC., Olathe, KS (US)

(72) Inventors: Jonathan R. Feldkamp, Olathe, KS (US); Richard A. Hofer, Gardner, KS (US); Louis E. Estingoy, III, Overland Park, KS (US)

(73) Assignee: CASTLE CREATIONS, INC., Olathe, KS (US)

( * ) Notice: Subject to any disclaimer, the term of this patent is extended or adjusted under 35 U.S.C. 154(b) by 0 days.

(21) Appl. No.: 14/720,310

(22) Filed: May 22, 2015

(65) Prior Publication Data
US 2015/0253770 A1    Sep. 10, 2015

Related U.S. Application Data

(62) Division of application No. 13/168,643, filed on Jun. 24, 2011, now Pat. No. 9,043,047.

(51) Int. Cl.
*G05D 1/00* (2006.01)
*G06F 17/00* (2006.01)
(Continued)

(52) U.S. Cl.
CPC ........... *G05D 1/0022* (2013.01); *A63H 30/04* (2013.01); *B60R 25/00* (2013.01); *B60R 25/102* (2013.01);
(Continued)

(58) Field of Classification Search
CPC ...... G05D 1/0022; A63H 30/04; B60R 25/00; B60R 25/102; G07C 9/00182; G08C 17/02; H04N 7/185
See application file for complete search history.

(56) References Cited

U.S. PATENT DOCUMENTS

| 5,481,257 A | 1/1996 | Brubaker et al. |
| 6,293,798 B1 | 9/2001 | Boyle et al. |

(Continued)

FOREIGN PATENT DOCUMENTS

EP    1121245 B1    12/2008

OTHER PUBLICATIONS

Frommer, Square Starts Shipping New iPhone 4-Compatible Credit Card Reader, http://www.businessinsider.com/square-starts-shipping-new-iphone-4-compatible-credit-card-reader-2010-10#top, Oct. 21, 2010, 2 pgs.

(Continued)

*Primary Examiner* — Nicholas Kiswanto
(74) *Attorney, Agent, or Firm* — Shook, Hardy & Bacon L.L.P.

(57) ABSTRACT

Electronic components that are operable within remote control vehicles include Electronic Speed Controllers, radio control receivers, and telemetry transmitters. Hardware and software are described that support communication between a user computer and electronic components. A data link device has analog input and output interfaces that communicate to a mobile computing device such as smartphone. The data link device communicates with an electronic component to send and receive data such as parameters or operational data over a wired bidirectional bus interface. Software for performing data link operations run for example on an electronic component, a mobile computing device, a smartphone, a data link device, or a telemetry receive radio, or a combination of the above.

12 Claims, 12 Drawing Sheets

(51) Int. Cl.
*A63H 30/04* (2006.01)
*B60R 25/00* (2013.01)
*E05B 47/00* (2006.01)
*H04N 7/18* (2006.01)
*B60R 25/102* (2013.01)
*G07C 9/00* (2006.01)
*G08C 17/02* (2006.01)

(52) U.S. Cl.
CPC .............. *E05B 47/00* (2013.01); *G06F 17/00* (2013.01); *G07C 9/00182* (2013.01); *G08C 17/02* (2013.01); *H04N 7/185* (2013.01)

(56) References Cited

U.S. PATENT DOCUMENTS

| | | | | |
|---|---|---|---|---|
| 6,522,265 | B1* | 2/2003 | Hillman | B60R 16/0373 340/988 |
| 6,949,002 | B2 | 9/2005 | Yamaguchi et al. | |
| 7,010,628 | B2 | 3/2006 | Cloud et al. | |
| 7,210,656 | B2 | 5/2007 | Wolf et al | |
| 7,395,126 | B2 | 7/2008 | Decker | |
| 7,507,140 | B2 | 3/2009 | Yamaguchi | |
| 7,731,588 | B2 | 6/2010 | Templeman | |
| 7,740,516 | B2 | 6/2010 | del Castillo | |
| 7,843,431 | B2 | 11/2010 | Robbins et al. | |
| 7,978,059 | B2* | 7/2011 | Petite | G01D 4/004 340/521 |
| 8,049,601 | B1 | 11/2011 | Hofer et al. | |
| 8,632,376 | B2 | 1/2014 | Dooley et al. | |
| 8,678,876 | B2 | 3/2014 | Persaud et al. | |
| 2004/0145244 | A1* | 7/2004 | Gan | G06F 13/4086 307/116 |
| 2006/0223637 | A1* | 10/2006 | Rosenberg | A63F 13/10 463/47 |
| 2007/0015485 | A1 | 1/2007 | DeBiasio et al. | |
| 2008/0057886 | A1 | 3/2008 | Feher | |
| 2010/0087980 | A1* | 4/2010 | Spura | H04B 7/18504 701/24 |

OTHER PUBLICATIONS

Osborne, Accept credit card payments on your iPhone: Square app hits the App Store, http://www.geek.com/articles/mobile/accept-credit-card-payments-on-your-iphone-square-a, May 12, 2010, 7 pgs.

2Try2010-10-10 09 36 30.pdf; Turn Your iPhone into an IR Remote ThinkFlood RedEye Mini, Skymall magazine advertisement, Oct. 2010, 1 pg.

Credit Card Readers for the iPhone IMerchant Pro POS System, http://www.phonetransact.com/credit-card-reader-for-the-iphone/, Jan. 27, 2011, 4 pgs.

Kuo et al., Hijacking Power and Bandwidth from the Mobile Phone's Audio Interface, Dev'10 Proceedings of the First Annual Symposium on Computing for Development, London, United Kingdom, Dec. 17-18, 2010, 6 pgs.

Speed Passion Revetton ESC w/Bluetooth—The Toyz Forums, General RC Forum and Chat, New RC Information, Electronics/Radio Equipment, Jan. 27, 2011, 2 pgs.

International Search Report with Written Opinion dated Sep. 19, 2012 in Application No. PCT/US12/43711, 10 pages.

Non-Final Office Action dated Aug. 20, 2014 in U.S. Appl. No. 13/168,643, 14 pages.

Notice of Allowance dated Jan. 27, 2015 in U.S. Appl. No. 13/168,643, 6 pages.

* cited by examiner

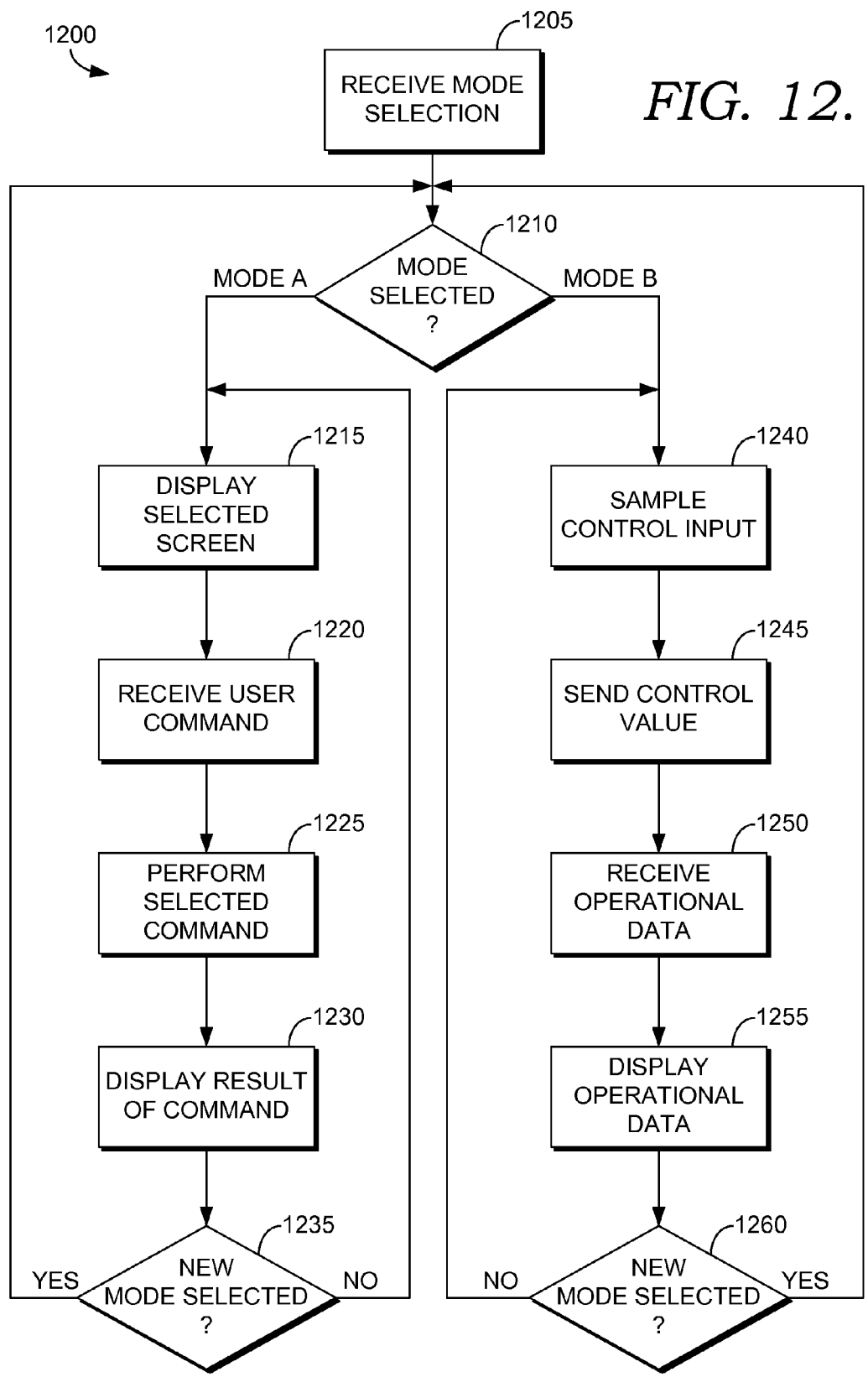

DATA LINK FOR USE WITH COMPONENTS OF REMOTE CONTROL VEHICLES

CROSS-REFERENCE TO RELATED APPLICATIONS

This Nonprovisional patent application is a divisional application of U.S. Nonprovisional patent application Ser. No. 13/168,643, filed Jun. 24, 2011, entitled "DATA LINK FOR USE WITH COMPONENTS OF REMOTE CONTROL VEHICLES," the teachings of which are incorporated herein by reference in their entirety.

SUMMARY OF THE INVENTION

According to a first embodiment, an apparatus for supporting communication between a user computer and an electronic component operable within a remote control vehicle is defined. The apparatus has a first analog input interface that can be coupled to a first analog output of a user computer. The apparatus also has a first analog output interface that can be coupled to a first analog input of the user computer. The apparatus also has a bidirectional wired bus interface that can be coupled to a electronic component, wherein said electronic component is operable within a remote control vehicle. The apparatus also has a microprocessor coupled to the first analog input interface, the first analog output interface, and the wired bidirectional bus interface. The microprocessor is configured in a first mode to decode a first set of digital symbols received from the first analog input interface to produce first digital data, wherein the first digital data comprises parameters associated with said electronic component. The microprocessor stores the first digital data. The microprocessor is configured to encode the first digital data in a format compatible with the wired bidirectional bus interface. The microprocessor is configured to decode information received from the wired bi-directional digital bus interface to produce second digital data. The microprocessor is configured to encode a second set of digital symbols representing the second digital data for transmission on the first analog output interface.

According to a second embodiment computer-readable storage media having computer-usable instructions embodied thereon that, when executed, enable two or more computers to perform a method of communicating between an electronic component and a mobile computing device is described. In the method a first device stores operational data associated with an electronic component, wherein the electronic component is operable within a remote control vehicle. The first device controls digital encoding of values of the operational data. The first device transmits over a first interface the values of the operational data, wherein the first interface is compatible with a microphone input at a mobile computing device. An application on the mobile computing device receives via the microphone input the values of the operational data. The application on the mobile computing device provides the values of said operational data for display at the mobile computing device.

According to a third embodiment, computer-readable storage media having computer-usable instructions embodied thereon that, when executed, enable two or more computers to perform a method of communicating between an electronic component and a mobile computing device is described. A first electronic component communicates in a first mode of communication wherein a bidirectional bus interface is used for one directional control communication. In a second mode of communication, the first electronic component communicates by storing operational data within the first electronic component, wherein the first electronic component is operable within a remote control vehicle. The first hobby device controls digital encoding of values of the operational data. The first hobby device transmits over a wired bidirectional bus interface the values of the operational data. The first hobby device receives device control data from a second electronic component over the wired bidirectional bus interface; and applies the device control data.

According to a fourth embodiment, computer-readable storage media having computer-usable instructions embodied thereon that, when executed, enable two or more computers to perform a method of communicating between an electronic component and a mobile computing device are described. A hobby device operable in a remote control vehicle receives information comprising operational data, wherein the receiving takes place over a wired throttle control bus interface. The hobby device stores operation data, and controls digital encoding of values of the operational data. The hobby device transmits the values of the operational data, wherein the first interface is compatible with a spread spectrum receiver at a mobile computing device. Software at the mobile computing device receives via the spread spectrum receiver at the mobile computing device the values of said operational data.

BRIEF DESCRIPTION OF THE SEVERAL VIEWS OF THE DRAWINGS

The present invention is described in detail below with reference to the attached drawing figures, wherein:

FIG. 12 is an exemplary method of communicating with an electronic component suitable for operation at a mobile computing device in accordance with an embodiment of the present invention.

DETAILED DESCRIPTION OF THE INVENTION

Figure 1:
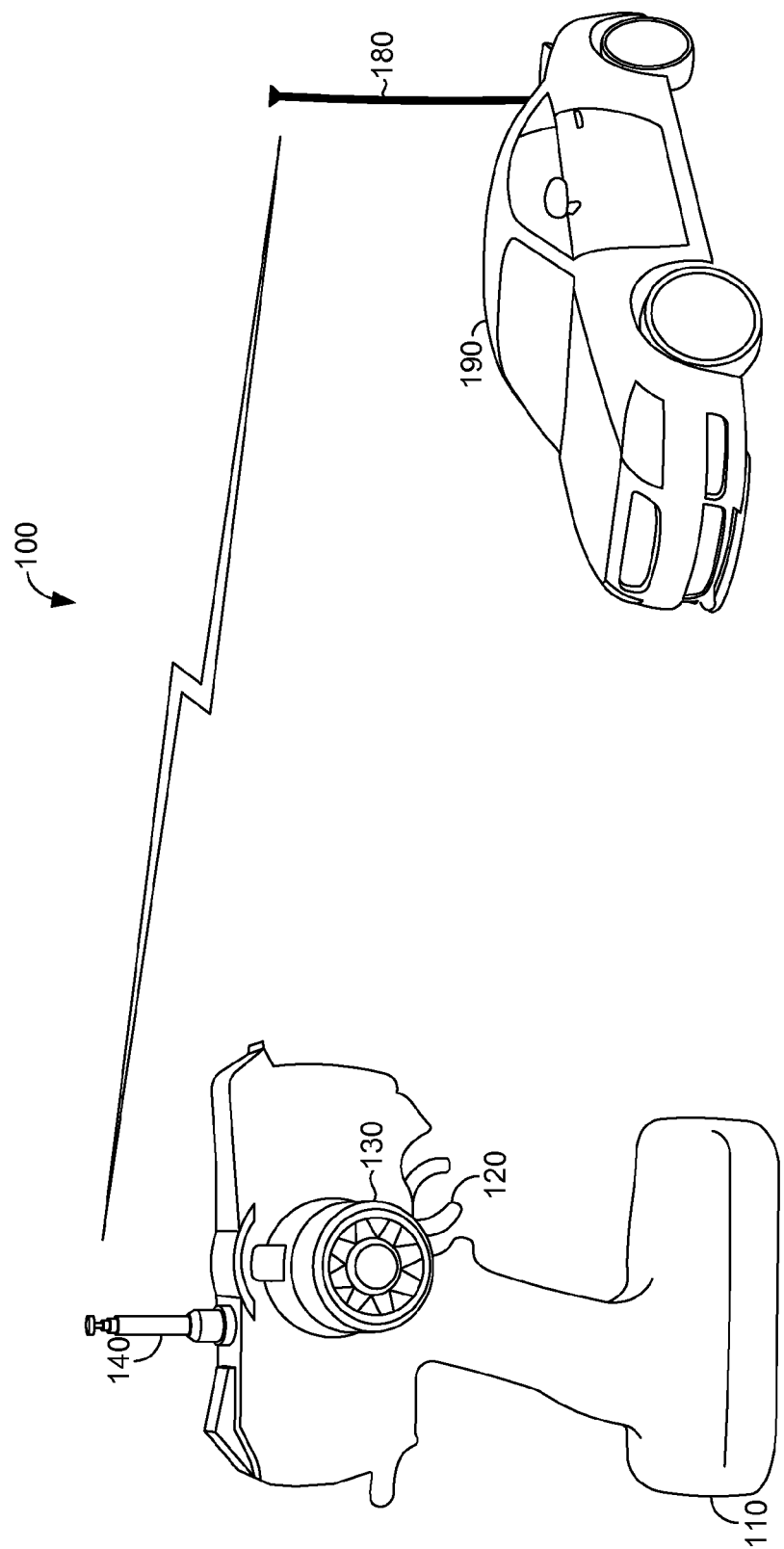
FIG. 1 is a hobby electronic system utilizing a remote control transmitter in accordance with an embodiment of the present invention.

Embodiments of the present invention provide systems and methods for communicating between a hobby device and a computer. For the purpose of illustrating exemplary operation of the systems and methods, particular configurations are presented and described herein. The techniques described are not limited to the particular problem or to the context in which they are described for purposes of illustration.

The subject matter of the present invention is described with specificity to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described. Further, the present invention is described in detail below with reference to the attached drawing figures, which are incorporated in their entirety by reference herein.

The invention may be described in the general context of computer-executable instructions, such as program modules, being executed by a computer or server. Generally, program modules include routines, programs, objects, scripts, components, data structures, etc., that perform particular tasks or implement particular abstract data types. The invention may be practiced with a variety of computer, or server configurations, including hand-held devices, smartphones, personal digital assistants, tablet computers, mini tablet computers, laptop systems, desktop systems, multiprocessor systems, microprocessor-based or programmable-consumer electronics, workstations, minicomputers, mainframe computers, and the like. Networks include typical networks such as the internet, wireless networks, and private networks such as wireless routers or enterprise networks. The invention may also be practiced in distributed-computing environments where tasks are performed by remote-processing devices that are linked through a communications network. In a distributed-computing environment, program modules may be located in both local and remote computer-storage media including memory storage devices.

Embodiments of the present invention may be embodied as, among other things: a method, system, or computer-readable medium. Accordingly, the embodiments may take the form of a hardware embodiment, a software embodiment, or an embodiment combining software and hardware. In one embodiment, the present invention takes the form of computer-readable media that include computer-useable instructions embodied thereon.

Computer-readable media include both volatile and nonvolatile media, removable and nonremovable media, and contemplate media readable by a database, a computer, and various other computing devices. By way of example, and not limitation, computer-readable media comprise computer-storage media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, eDRAM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

The hobby electronics market provides remote control devices for use with remote control vehicles in a wide variety of forms. Hobby remote control vehicles include hobby cars, helicopters, boats, airplanes, submarines, specialized craft (e.g., blimps and balloons), as well as sophisticated commercial vehicles such as Unmanned Aerial Vehicles (UAVs). Typically a handheld remote control transmitter reacts to user manipulations of actuators such as a dial, a trigger, a joystick, etc. The remote control (RC) Transmitter translates user manipulations into control signals that are then sent to a hobby RC vehicle that applies the control commands.

A smartphone includes a mobile phone that offers more advanced computing ability and connectivity than a basic feature phone. A basic feature phone typically has little more input/output capability beyond built in keypad, microphone and speaker. The recent growth in popularity of the smartphone has fueled a resurgence in various personal digital assistant (PDA) products such as the iPad® marketed by Apple Inc. of Cupertino Calif.

Turning now to FIG. 1, there is presented a diagram of representative hobby electronic system 100 showing in normal use. A remote control transmitter 110 receives user manipulations of actuators such as throttle trigger 120 and steering dial 130, converting these manipulations into radio frequency signals transmitted from antenna 140. Representative remote control vehicle 190 receives the signals from antenna 180 and converts them into local speed and steering commands. Remote control vehicles such as hobby car 190 could alternatively be any hobby remote control vehicle including hobby helicopter, hobby boat, hobby airplane, or UAV. Remote control transmitter 110 could alternatively be any hobby remote control transmitter including additional similar actuators, and other actuators such as joysticks, buttons, etc. Low-cost transmitters such as transmitter 110 typically transmit with a low carrier frequency of about 72 MHz carrier, and typically use frequency modulation (FM) information encoding to encode a number of repeating pulse width modulation channels to serve a number of control channels (e.g. 7-channel). Alternatively, the carrier of a low-cost transmitter could be 35, 36, 40, 50, or 75 MHz. Embodiments are capable of encoding data using frequency modulation (FM) and/or amplitude modulation (AM). Low-cost transmitters typically provide only one-way communication from the remote control transmitter 110 to remote control vehicle 190. Other wireless communication techniques operable with embodiments of the present invention include one-directional or two-directional unlicensed conventional or spread-spectrum modulation transmitted at about 900 MHz, 2.4 GHz, or 5.8 GHz carrier frequencies. Carrier frequencies within 20% of the nominal value are considered to be about the same. Because the hobby market is relatively small, the more elaborate two-directional transmitters may be expensive because they are special purpose devices.

Figure 2:
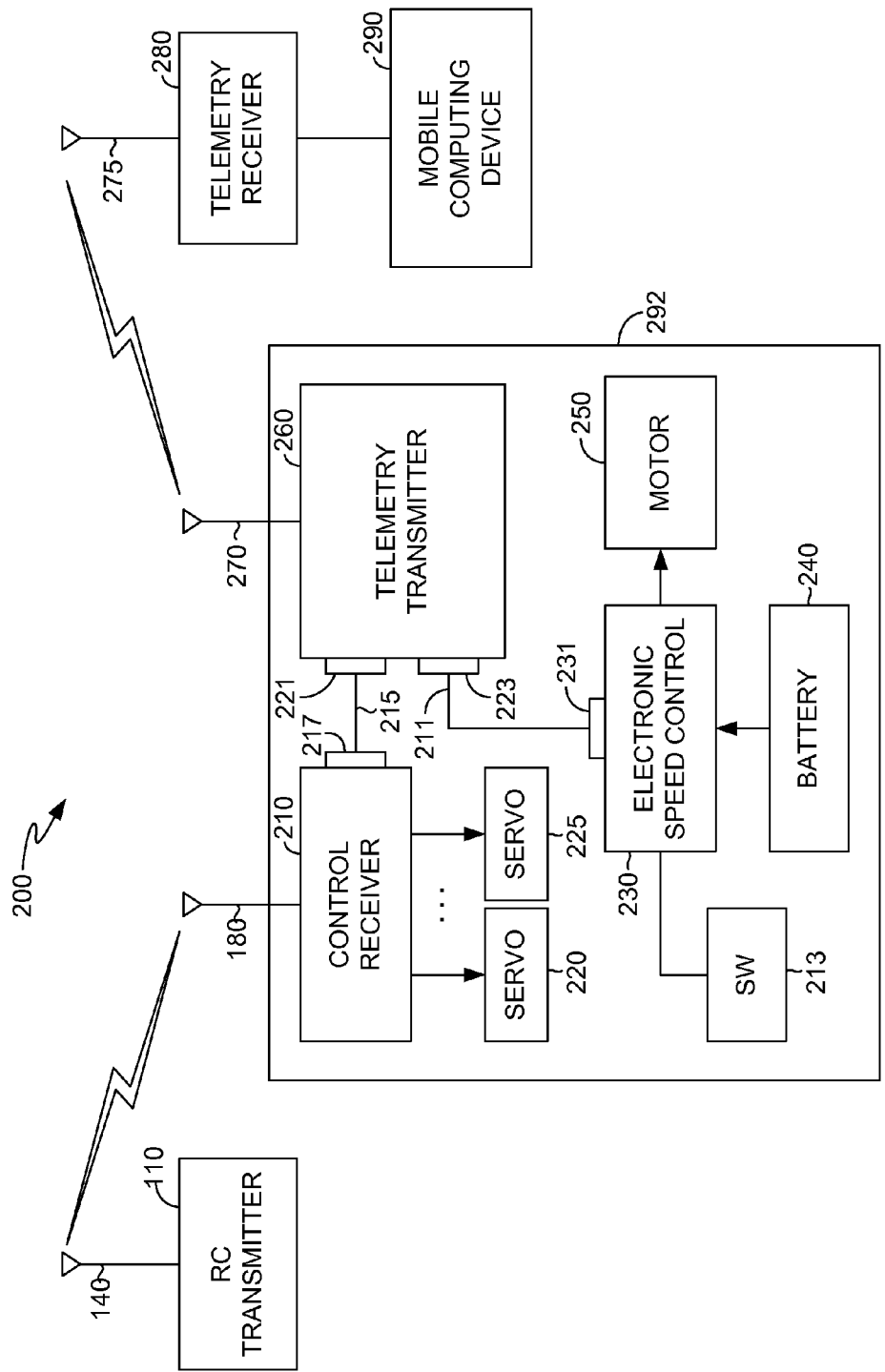
FIG. 2 is a block diagram of representative system elements of an electronic hobby system utilizing a mobile computing device and a remote control transmitter in accordance with embodiments of the present invention.
Figure 10:
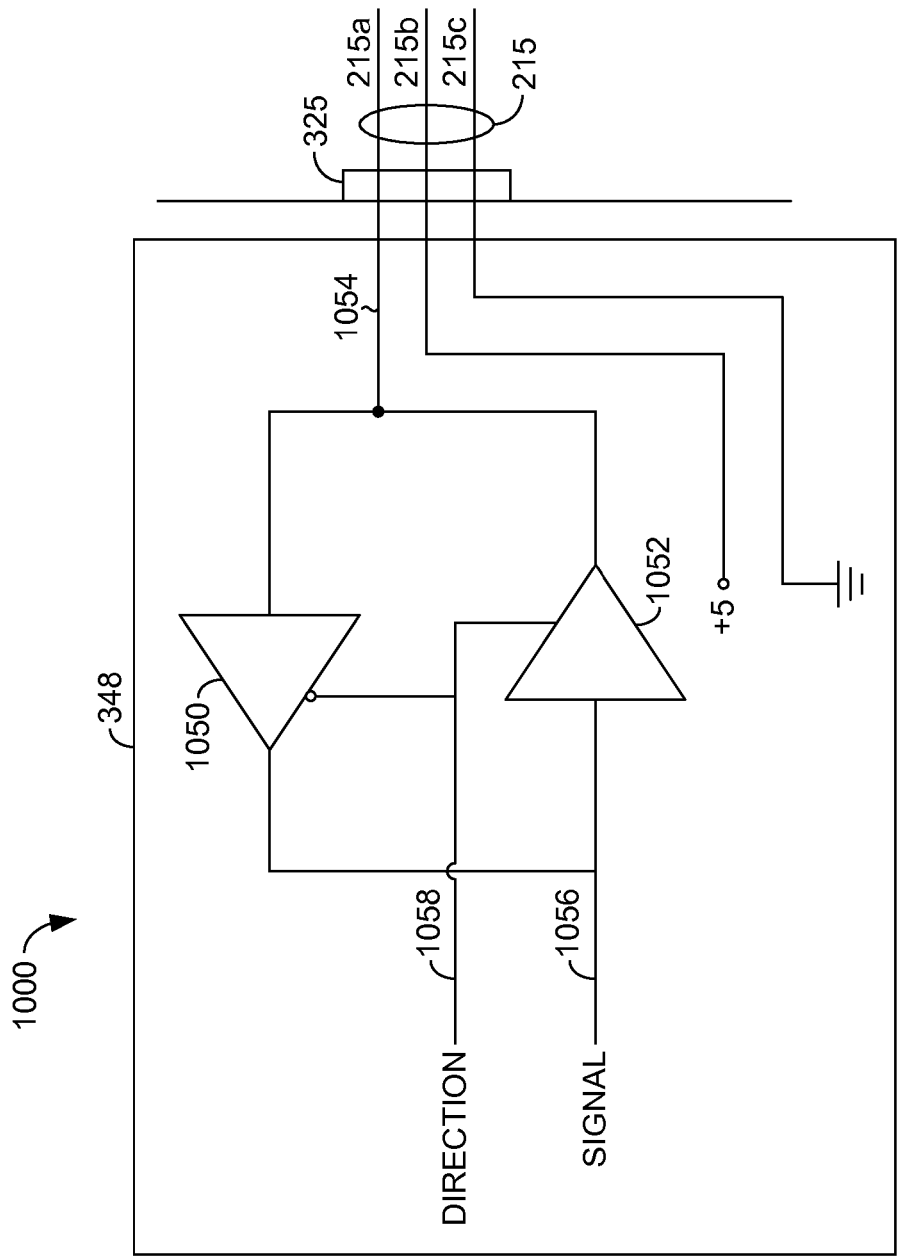
FIG. 10 is an exemplary diagram of a bus interface and bidirectional port in accordance with an embodiment of the present invention.

Turning now to FIG. 2, there is depicted in 200 a block diagram of representative system elements of an in-use electronic hobby system in accordance with embodiments of the current invention. A transmitter 110 that could be a low-cost transmitter sends control signals through antenna 140 which are received at control antenna 180 and recovered in control receiver 210 at remote control vehicle 292. A switch 213 allows the power within remote control vehicle 292 to be disabled. The configuration shown in FIG. 2 supports a telemetry transmitter 260 that sends telemetry information through a second wireless link out antenna 270 to antenna 275 and telemetry receiver 280. The control receiver 210 breaks out control channels for a number of servos such as servo 220 and servo 225, and also places a throttle control signal on throttle port 217 sending the throttle control signal along cable 215 to telemetry transmitter 260 through port 221. Embodiments of port 217 include a three pin connector such as connector 325 as further detailed in FIG. 10. The telemetry transmitter 260 sends the throttle control signals out through port 223 along cable 211 to port 231 of the Electronic Speed Control (ESC) 230. An ESC 230 takes power received from battery 240 and applies the power to a DC motor 250 by controlling the timing and duration of voltage pulses that are applied to DC motor 250.

Figure 4:
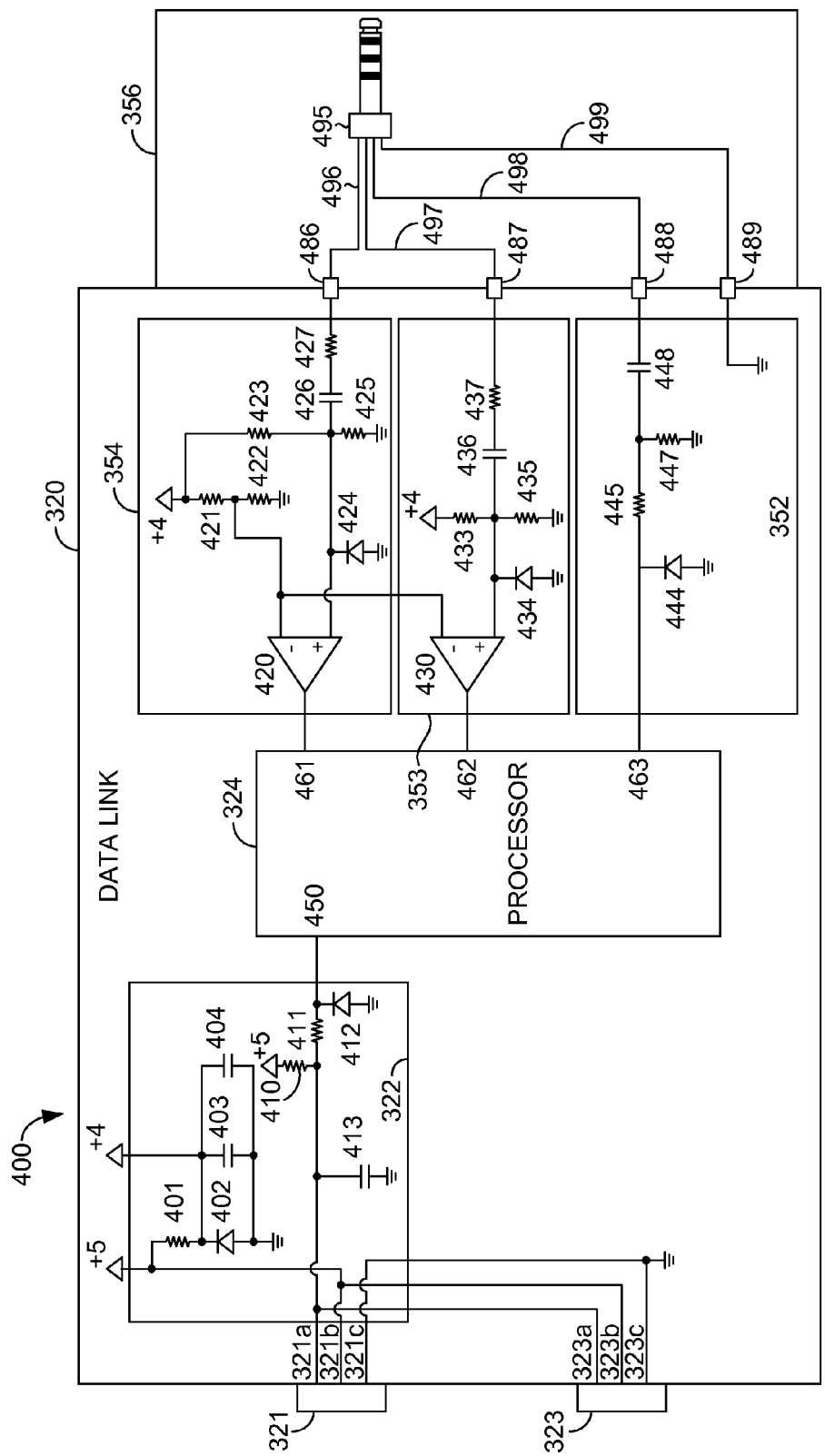
FIG. 4 is an exemplary embodiment of an apparatus showing exemplary detail of a data link device and a transmission medium in accordance with embodiments of the present invention.

Embodiments of telemetry transmitter 260 simply replicate the input port 221 so that all signals present on port 221 are placed on port 223, as shown in further detail in FIG. 4 by bidirectional bus interface 322 which replicates port 321 to port 323. Embodiments of the telemetry transmitter 260 operate in a disabled, or legacy mode, in which the control interface between port 217 and port 231 follow standard legacy Pulse Width Modulation (PWM) signaling. In the standard legacy PWM signaling from port 217 of control receiver 210 effects control of the ESC 230 when control values are received through port 231. According to standard signaling a three wire interface consists of power, ground, and a unidirectional data path. The data path is normally low, and a pulse is sent by RC Transmitter 210 by bringing the line high for a pulse of variable width. High and low values are nominally 5 Volts and 0 Volts respectively, but other values are equally possible. Pulses are sent periodically from control receiver 210 using a period that varies by manufacturer, typically between 10 ms to 20 ms from leading edge to leading edge. The corresponding pulse frequency varies between 100 Hz to 50 Hz. Data is encoded in the pulse width which typically encodes a value between a minimum of about 1 ms and a maximum of about 2 ms. Variation within 20% of the minimum or maximum value is common. Variations can typically be calibrated out in the speed control 230.

Embodiments of telemetry transmitter 260 operate in a live-data mode in which operational data from the ESC 230 are received by telemetry transmitter 260 and are transmitted to telemetry receiver 280. Embodiments of operational data include alarm conditions of operational statistics measured during operation such as Under Voltage Detected, Over Current Detected, Over Temperature Detected, Throttle Signal Lost, Motor Tracking error, etc. Embodiments of operational data include operational measurements of the ESC such as voltage, ripple voltage, current, temperature, motor RPM, throttle input received, power output percentage, Battery Eliminator Circuit (BEC) Voltage, BEC Current, etc. Embodiments of the Telemetry receiver 280 have an internal battery and output means such as outputs such as LCD displays, LED's, or speakers that provide recently received alarms, values or signals to alert a user. When an ESC sends operational data, a telemetry receiver 280 notifies the user of the data by displaying the data on an LCD display, by lighting an LED or by providing a warning sound on the Telemetry receiver 280. Embodiments of Telemetry receiver 280 pass operational data to mobile computing device 290, which presents the operational data to the user.

An electronic component, as used herein, which can work in a remote control vehicle includes the likes of control receiver 210, ESC 230, telemetry transmitter 260, a servo 220, telemetry receiver 280, as well as other components as the case may be. Electronic components typically have parameters stored in internal storage. Parameters associated with a electronic component could include device firmware data, operational settings, alarm settings, etc. Operational settings are any variables that are settable within a electronic component. Operational settings could include of the following items:

Arming Time, which sets the initial required time an ESC must see a 'neutral' or 'non-active' command before it becomes armed, or, is in an active state;

Auto-Lipo Volts per Cell, which sets a cutoff voltage for an ESC wherein a controller initiates a low voltage cutoff once the controller detects voltage dropping below this value times the number of cells detected in the power up sequence;

BEC Voltage, a value which selects the output voltage of the onboard switching Battery Eliminator Circuit (BEC) that outputs power to the receiver and servos;

Brake Amount (or Brake Strength), which sets the percentage of available braking power that is applied with a full brake control movement;

Brake Delay, which sets an amount of time before a brake signal is applied, which is often used to protect components such as gearboxes and belt drives from damage;

Brake Ramp, which causes the brake value to ramp from 0 to the desired value in a specified period of time, allowing high brake strengths with less fear of damage to components such as gearboxes and belt drives;

Brake Type (or Brake/Reverse Type), which specifies whether or not reverse will be enabled and how it will be accessed (e.g. reverse lockout, Forward/Brake only, Forward/Brake/Reverse);

C.H.E.A.T. Activation Range, which controls the gradual application of Timing Boost, giving a smooth transition from 0 degrees of timing boost to the amount specified in the CHEAT Mode Timing Boost, and also may specify the RPM values to begin and end Timing Boost;

C.H.E.A.T. Mode Enable, which gives the ability to program a controller to run with very high amounts of electronic timing advance or Timing Boost;

C.H.E.A.T. Timing Boost, which allows the user to adjust the maximum amount of electronic timing advance delivered to the motor;

Current Limit, which sets an upper limit on current that may be experienced;

Cutoff Type, which determines the way that an ESC responds to a low voltage situation, e.g. hard cutoff which typically turns off the motor when a low-voltage condition occurs, whereas a soft cutoff reduces the throttle to a level to keep the voltage at or near the cutoff voltage level;

Cutoff Voltage, which is a value used by the system to determine that the voltage level is at the low cutoff level;

Data Log Enabled, which enables the logging of data;

Drag Brake Amount, which determines the fraction of braking that is applied when the throttle is in a neutral position;

Drag Brake Type, which specifies the type of drag braking to apply;

Failsafe Enabled, which is a control receiver setting that, under a loss of signal condition, causes servos to move to and hold a pre-programmed position until signal returns;

Failsafe Port (1 through 9) Values, which is a control receiver setting, that determines values to map for each port during a failsafe condition;

Governor Gain, which is a helicopter adjustment, that can be used to set the feedback level used to maintain a constant motor RPM;

Head Speed Change Rate, which controls how quickly the head changes between speeds and how quickly the head speed recovers;

Initial Spool-Up Rate, which controls the rate of throttle advance on the initial spool up of a helicopter;

Max Reverse Power, which is the maximum speed in reverse, typically expressed as a percentage of forward speed;

Midcount, Maxcount, Mincount, which are typically used in control receivers to effect radio calibration;

Motor Direction (or Direction), which allows software to control default direction of motor rotation;

Motor Start Power (or Start Power), which allows the motor to provide less than the max available power at start time, to provide a smooth (no kick) start;

Motor Timing, which controls the phase of motor timing, typically low advance typically reduces the amp draw, increases runtime, reduces motor/battery temperature, and may reduce top speed and punch, whereas raising the timing advance has opposite effects;

Motor Type, which typically indicates whether the motor is sensored or sensorless, and whether it is brushed or brushless;

Output Frequency, which typically indicates the output frequency of the pulsed width modulation signal that indicates throttle control level;

Power-On Warning Beep, which controls whether or not to provide a warning beep if power is left on, but device is not being used;

Punch Control, which controls how fast the throttle position within the ESC can be changed over time;

PWM Rate, which typically adjusts the switching rate so that it is chosen appropriately for motor type and inductance level;

Quiet Mode, which determines whether or not the device is running in a quiet mode;

Reverse Throttle Curve, which typically indicates the translation between a control level and a delivered throttle level in the reverse direction;

Reverse Type, which typically indicates the type of reverse control that is supplied.

Rx Ports (1 through 9), which is a control for a receiver that determines the port mapping used;

Sample Frequency, which typically controls the rate at which samples are taken;

Throttle Curve, which typically indicates the translation between a control level and a delivered throttle level in the forward direction;

Throttle Dead Band, which typically controls the amount of play or dead span in the neutral setting of a throttle control;

Throttle Response, which typically controls the maximum rate of change mapping from user control manipulation to applied throttle level;

Throttle Type, which typically describes the method of throttle control, e.g. whether or not the throttle is auto-calibrating, or fixed; and Torque Control, which typically limits the amount of torque applied to the wheels during acceleration.

Figure 3:
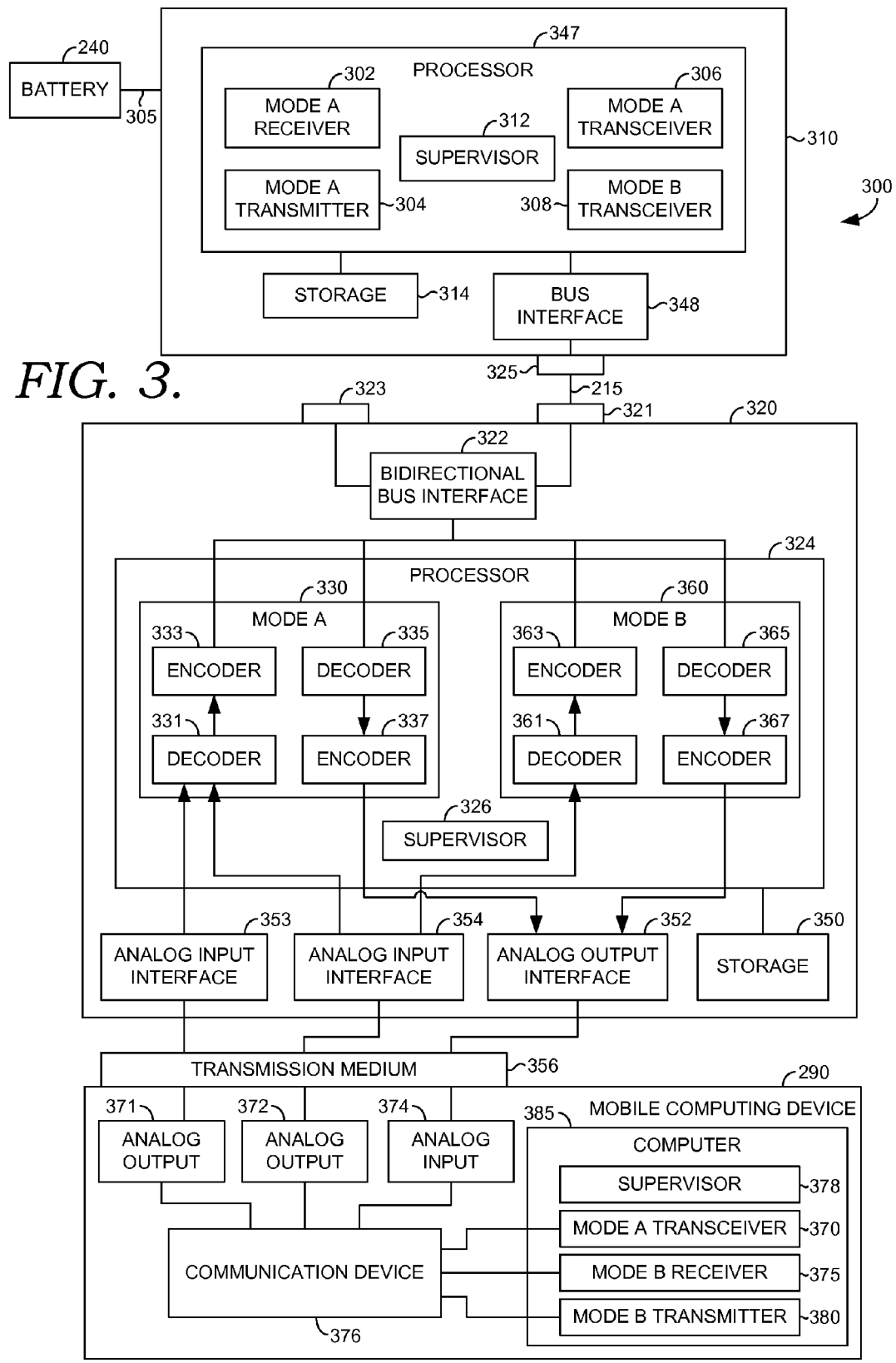
FIG. 3 is an exemplary block diagram of an apparatus for supporting communication between a mobile computing device and an electronic component in accordance with embodiments of the present invention.

Turning now to FIG. 3 there is depicted in 300 an exemplary block diagram of an apparatus for supporting communication between a user computer such as general purpose mobile computing device 290 and electronic component 310. The data link 320 typically operates in a maintenance mode for programming or changing data within a storage area 314 of a device under maintenance such as electronic component 310. In the configuration shown in apparatus 300, power is supplied to data link 320 from the device under maintenance 310 through cable 215. Device 310 receives power from battery 240 through cable 305. In other embodiments, data link 320 is powered directly through a battery such as 240, and data link 320 supplies power to device 310 through cable 215. Other embodiments of deriving power include data link 320 deriving power through analog input interface 353 from a signal derived from mobile computing device 290 through transmission medium 356.

Electronic component 310 includes processor 347 and internal storage 314. Communication takes place through bus interface 348 through port 325. Processor 347 runs a number of software applications 302, 306, 304, 308, and 312 for managing sending and receiving of data from device 310 to mobile computing device 290. Embodiments of Mode A transmit and receive functions are combined into module 306. Other embodiments of Mode A transmit and receive functions are separated into two modules 304 and 302 respectively. An embodiment of bus interface 348 is shown in more detail in circuit 1000 of FIG. 10. Line 1056 carries data to and from processor 347 to the bidirectional data path 1054 that that is connected to line 215a of cable 215. The BUS interface 348 includes a buffer circuit. A receive buffer 1050 and a send buffer 1052 are connected to bidirectional signal line 1054 which couples to line 321a of data link 320, and to a signal line 1056 from processor 347. A direction signal line 1058 is connected to each of the buffers 1050 and 1052 to enable or disable the respective buffer. A 5V signal is provided in line 215b of cable 215 to provide voltage input 321b of data link 320. A ground signal is provided on line 215c of cable 215 for a common reference to ground input line 321c of data link 320.

Figure 7:
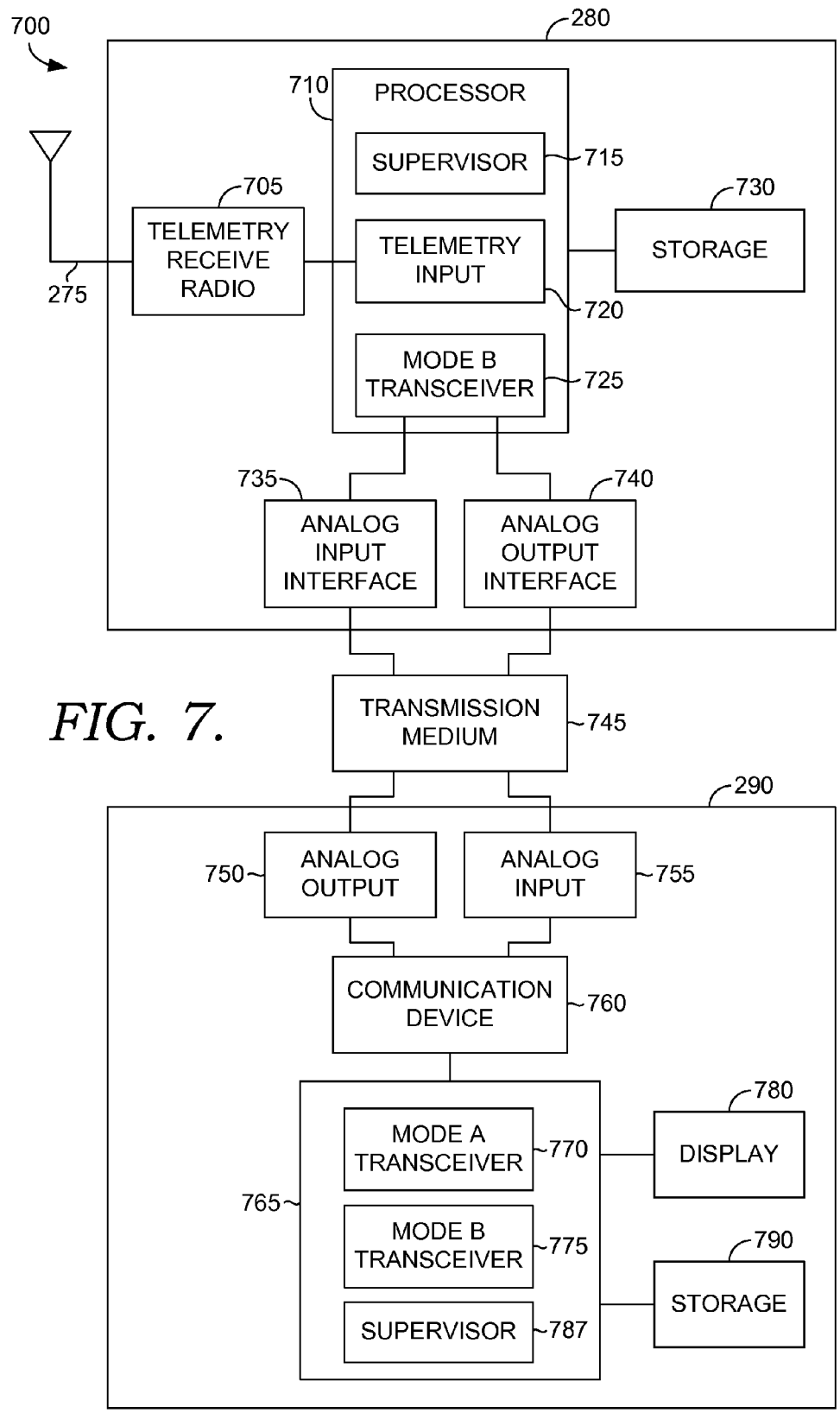
FIG. 7 is a block diagram of an apparatus showing exemplary detail of a Telemetry Receiver and a mobile computing device in accordance with embodiments of the present invention.
Figure 9:
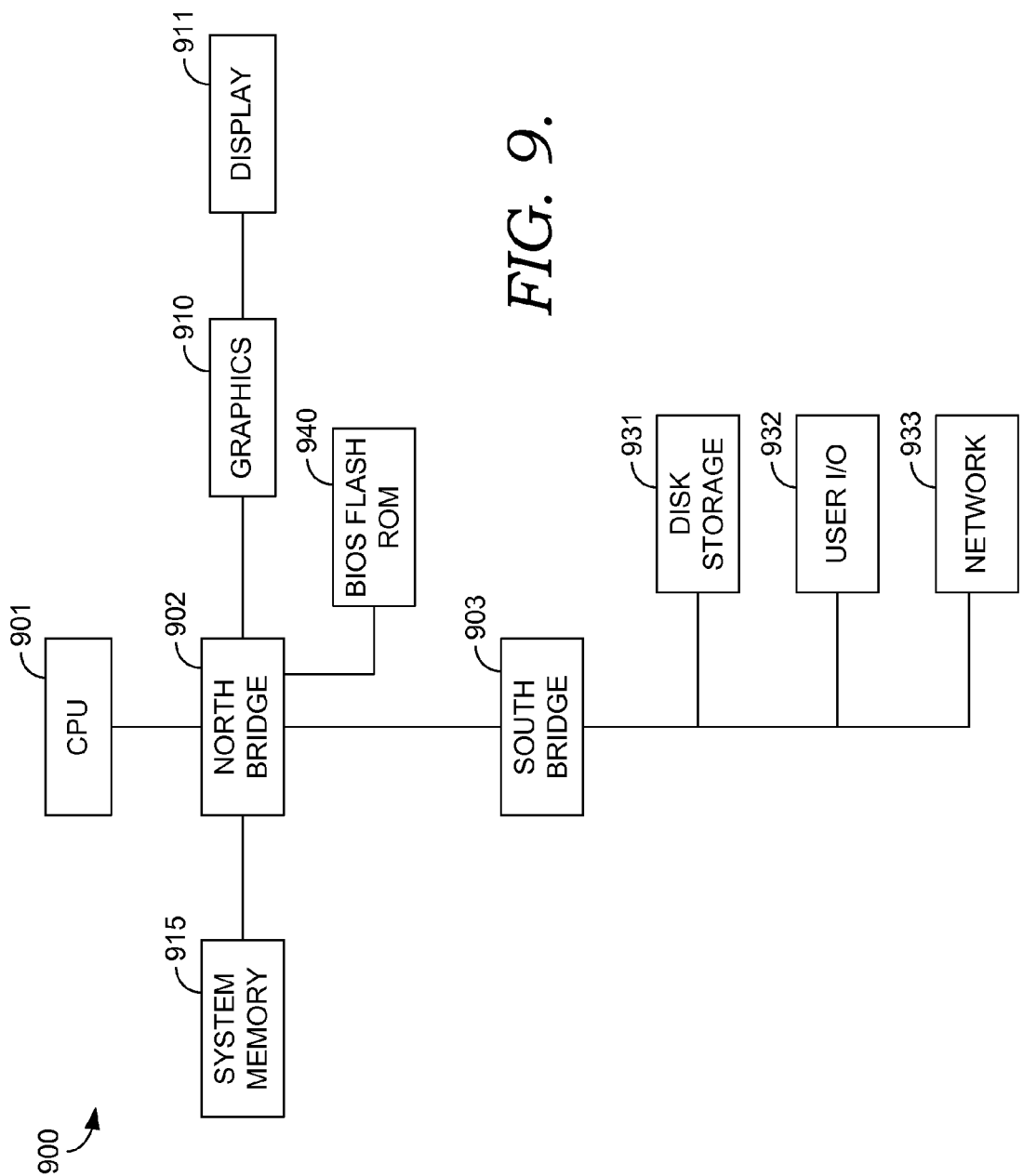
FIG. 9 is an exemplary system diagram of a mobile computing platform showing exemplary computer readable media for storing data in accordance with an embodiment of the present invention.

Mobile computing device 290 includes computer 385 which runs a number of software applications such as 378, 370, 375, 380 for managing the sending and receiving data from the device 310 using data link 320. Embodiments of mobile computing applications (e.g. 380) support multiple user interface languages such as English, Chinese, Spanish, etc. Other detail of mobile computing device 290 is shown in FIG. 7 and FIG. 9, as described more fully elsewhere herein. A supervisor application 378 interfaces to the user and determines which type of communication mode the user desires to use. Upon user selection of Mode A, the application 370 is activated to perform transmit and receive communication with device 310. Application 370 performs data exchange with the device 310 by: reading operational settings from the device 310; writing settings to device 310;

writing new firmware to the device 310; downloading data logs from the device 310; reading current alarm settings from device 310; writing new alarm settings to device 310; reading available data from the device 310 such as real-time value of the received radio signal; etc. A user can perform a number of operations on data associated with device 310 such as replace communication software on the device 310, replace motor controller software on device 310, erase flash memory contents on storage such as 314, program flash memory such as storage 314 beginning at a specified address, etc. Product improvements for device 310 can be downloaded, so that device 310 is upgraded. The user can reconfigure a device 310 so that it is suitable for another application such as changing from airplane firmware to helicopter or race firmware, for example. Groups of settings are also individually distinguished and transferred as a group in either direction to or from device 310. Additionally bug fixes and upgrades can be quickly and easily installed.

The application 370 allows the user to view on a display and change through an I/O device, settings on the device 310 in storage 314. The application 370 shows possible firmware options for the device 310. The application 370 makes use of a network or input device to obtain new firmware to be downloaded into device 310. Firmware instructions and data may be stored in the storage of a network server or in the internal storage of a computer 385. The application 370 is also able to download and display data logs from the device 310. The application 370 communicates with the data link by using a communication device 376 that serves as an I/O device attached to computer 385. Communication device 376 communicates over analog input 374 and analog outputs such as 371 and 372 over transmission medium 356 to communicate with corresponding interfaces within the data link such as 352, 354 and 353.

Embodiments of the interface between the mobile computing device 290 and the data link 320 make use of a communication device 376 which is a spread spectrum transceiver so that analog output 372 is a transmitter output, and analog input 374 is a receiver input, and transmission medium 356 is a spread spectrum antenna. Embodiments of analog input interface 354 and analog output interface 352 are then corresponding spread spectrum receiver and transmitter respectively. Embodiments of the spread spectrum interface include a member of the 802.11 family of standard waveforms or the Bluetooth™ waveform. The analog input 374 and analog outputs such as 372 and 371 are part of the native interface of the mobile computing device 290. In other words, the interfaces are designed by the manufacturer of the mobile computing device to couple to transmission medium 356 with manufacturer built-in or manufacturer compatible components such as antennas, jacks, or compatible adapters. Other examples of native connectors include built-in or connectable audio jacks that encompass analog speaker outputs for 371 and 372, and an analog microphone input for analog input 374.

Embodiments of bus interface 348 are compatible with an Inter-Integrated Circuit (I2C) bus, a Serial Peripheral Interface (SPI) bus, serial bus, or other bus. Embodiments of bus interface 348 do not include a common clock signal on cable 215. Embodiments place data on a bidirectional data path within cable 215 and read from the bidirectional data path within cable 215 in a predetermined sequence by processor 347. The mobile computing device 290 is responsible for negotiations and control of the mode of data link 320 and of electronic device 347.

In Mode A, communication over the bus interface 348 is accomplished using data packets. Exemplary packets begin with a synchronization start field, followed by a packet identifier. The packet identifier indicates the type of packet such as a token, data or handshake, for example. An address field specifies the address of either the source or destination of a data packet. A data field includes an integral number of bytes depending on the packet identifier. A cyclic redundancy check or checksum field is used to ensure that the data is transmitted and received correctly.

When power is detected by the electronic device 310 (e.g. by detecting power on line 1054 of FIG. 10), the electronic device 310 uses mode A transmitter 304 to send out a start or connect byte of data on a bidirectional data path within cable 215 and waits for a response from a device connected to cable 215. If a response is not received within a predetermined amount of time, such as 10 milliseconds for example, the device 310 sends another byte of data on a bidirectional line within cable 215. This continues until a connected device responds or a maximum number of retries is exceeded, for example.

More particularly, when the combined assembly of the mobile computing device 290, transmission medium 356 and data link 320 is initially connected to the device 310 trough port 325, an initialization procedure allows the data link 320 to support communication between device 310 and mobile computing device 290. Embodiments of the data link 320 listen for a connection signal such as a connect byte coming from computing device 290. Embodiments of the data link 320 listen for a connection signal such as a connect byte coming from device 310. Once a connect byte is received by data link 320, the data link 320 periodically pings a connected device at regular intervals to ensure the connected device such as device 290 or device 310, is still connected. The data link 320 determines via supervisor 326 that it should process data received over port 321 looking for Mode A packets. Embodiments of supervisor 326 accomplish this mode selection as a power up default. Embodiments of supervisor 326 receive a command from mobile computing device 290 to enter Mode A. Mode A module 330 is activated and handles Mode A processing of data. When the data link 320 operates within Mode A, packets are received by processor 324. The data link 320 responds to some packets, e.g. those querying the identifier of the data link 320, and the version number of the software on the data link 320. A data packet passes through port 321 (or alternatively through port 323) before it passes through bidirectional bus interface 322. Decoder 335 within processor 324 receives and decodes digital data from the received packet. Decoder 335 decodes received data by identifying the digital data comprising a packet. Processor 324 stores the resultant data in storage 350. Packets received by decoder 335 are encoded by encoder 337 for output to analog output interface 352. Transmission medium 356 then carries the packets through analog input 374 to communication device 376 which converts the data from analog to digital form for transfer to computer 385. Embodiments of communication device 376 additionally demodulate received symbols to form digital data. Embodiments of transceiver 370 process raw digital representations of the analog received data to recover packet data. Embodiments of encoder 337 encode binary symbols within a packet using frequency shift keying with a 5 kHz tone representing a first binary level, and a 10 kHz tone representing a second binary level. This choice of symbols works well with some microphone channels that have roof bandwidth of 44.1 kHz that provide analog input channel 374.

Once the start or connect byte is sent by Mode A transceiver 370, the mobile computing device 290 sends a data packet from Mode A Transceiver 370 through communication device 376, through analog output 372, and through transmission medium 356 to analog input interface 354. Embodiments of Mode A transceiver 370 use communication device 376 to encode symbols of the output data packet using binary encoding of 5 kHz or 10 kHz FSK. Embodiments use communication device 376 to convert the encoded data from digital to analog. Decoder 331 in conjunction with analog input interface 354 decodes the symbols in the data packet and store the digital data produced in storage 350. Embodiments increase the throughput of the link from the Mobile computing device 290 to the data link 320 by making use of a second output channel that provides packets from the Modea A Transceiver 370 through communication device 376 to a second analog output 371, through transmission medium 356 to another analog input interface 353 to be read by a decoder such as 331 within processor 324. This second channel is ordinarily available, for example, in smartphone applications where transmission medium 356 includes a Tip-Ring-Ring-Sleeve (TRRS) audio jack that has two speaker outputs and a microphone input integrated into a single jack.

Embodiments make use of a single-wire bidirectional bus implementation. Mode A encoder 333 retrieves the packet from storage 350 and encodes this digital data in a packet format compatible with the bus interface 348 by making use of bidirectional bus interface 322. For example, the Mode A module 330 controls the bidirectional bus interface by encoding all of the data in the packet onto a bidirectional data path, and when the packet is complete, the bidirectional output of bus interface 322 is switched after the last encoded bit to a high impedance state. In a high impedance state, an output line is not currently driven by the circuit, but is seen by the circuit as a floating or tri-stated wire. The packet is then received by device 310 in Mode A receiver 302. An acknowledge packet is sent from device 310 informing mobile computing device 290 that a packet was successfully received.

In embodiments a first data packet includes instructions as to the type of data transfer. For example: a download of a new group of firmware settings, an update of all software, or an update the communication software on device 310. The data link 320 operates for Mode A packets as an intermediary converting data into the correct form for forwarding, and translating digital data in both directions between the mobile computing device 290 and the device 310. Once a data transfer task is completed, embodiments of device 310 send an acknowledgment along with an error code if the checksum is incorrect. If the checksum is incorrect, the data link 320 will try to re-send a set number of times.

Figure 5:
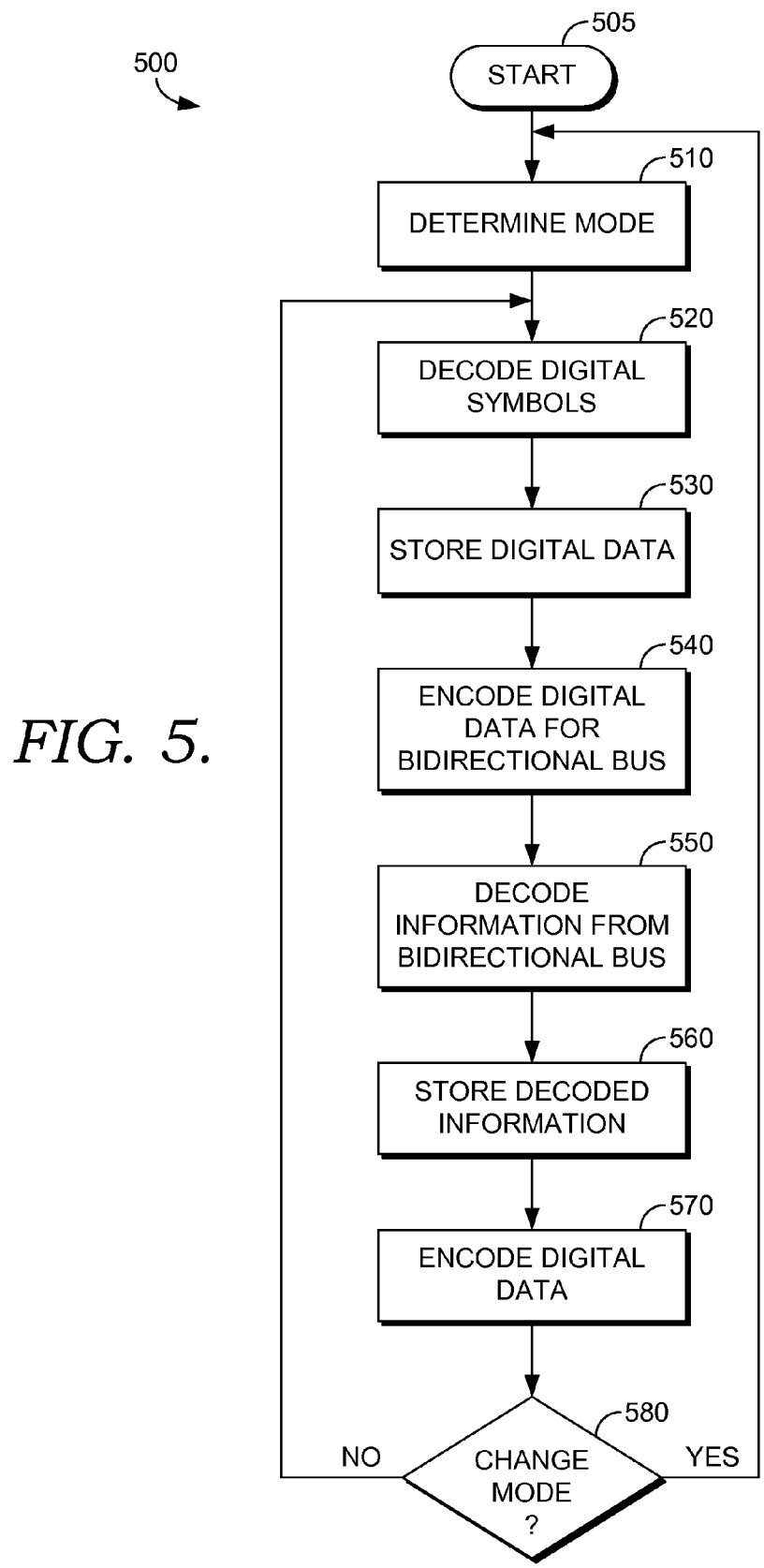
FIG. 5 is an exemplary flow diagram showing a method of communicating between an electronic component and a mobile computing device in accordance with an embodiment of the present invention.

Turning now to FIG. 5, there is depicted in 500 an exemplary method operable on a data link 320 for communicating between a hobby device 310 and a mobile computing device 290. Method 500 is useful for illustrating operation of mediation software such as module 330 that is active in Mode A or module 360 that is active in Mode B. Supervisor module 326 begins operation of method 500 at 505 and determines at 510 the mode of operation for the data link. In a first example, Mode A is selected on command from mobile computing device 290. In Mode A, Mobile computing device 290 provides a user the opportunity to select information transfer tasks such as programming alarm settings, setting current operational variable settings, reading operational measurements, reading operational statistics, downloading current alarm settings reading current operation variable settings, reading a data log, etc. Mode A module 330 proceeds to 520 where digital symbols received from analog input interface 354 are decoded to produce digital data comprising a portion of the data to be transferred. The data decoded includes parameters that make up the information transfer task selected. At 530 the digital data is stored for example in storage 350. At 540 Mode A module 330 encodes digital data in a format compatible with the wire bidirectional data bus, such as a packet that is placed on a bidirectional data path. Embodiments, after transmitting the encoded data, place the bidirectional data path in a high impedance state. The device 310 then receives the packet and responds by sending a response packet containing information such as a current alarm setting, a current operational variable setting, data log values, an operational measurement or an operational statistic, or a confirmation of successfully received data. The response packet is decoded at 550 by module 330 to produce digital data recovered from the response packet that is stored at 560 in storage 350. At 570 module 330 encodes the digital data from the response packet for transmission on analog output interface 352. At 580 a test is performed to determine if a new mode selection has been detected by supervisor 326. If the mode remains the same, then the method returns to 520 to continue mediating data transfers between Mobile computing device 290 and electronic component 310 under Mode A operation. Otherwise, if a mode change is indicated at 580, the method returns to 510 where the module for the new mode is activated. Embodiments of the method 500 skip encoding and decoding operations that are not needed, so that several transmissions in one direction take place in a row without a data transfer in the opposite direction. Embodiments pass data on more than one data path in parallel to decrease the total data transfer time.

Figure 8:
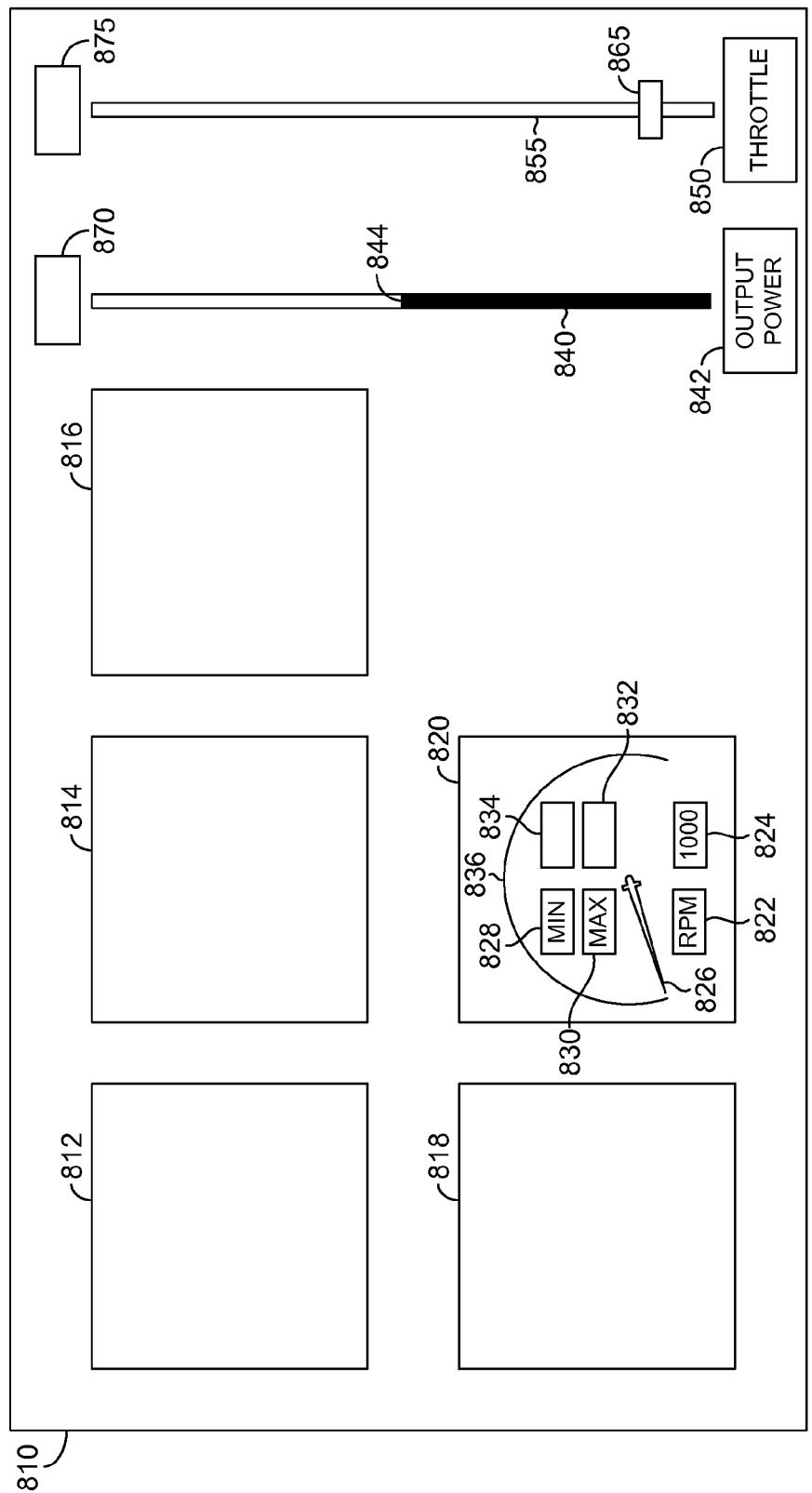
FIG. 8 is an exemplary display area showing operational data suitable to be provided at a mobile computing device in accordance with an embodiment of the present invention.

Returning to FIG. 3, the apparatus 300 is also suitable for a live-mode data transfer mode denoted Mode B. The live-mode is useful for testing a device 310 such as an ESC to see that the device is responding properly to control signals. The supervisor 326 determines that the communication between mobile computing device and hobby device 310 is to take place in Mode B, and so module 360 is activated. Mobile computing device 290 runs an application such as 380 that receives user input indicating a value to be controlled through a user interface. FIG. 8 shows representative input marker 865 controllable by the user to indicate an input visually indicated by a distance along slider bar 855. The position of marker 865 can be manipulated by a user input device such as a joystick, a touch joystick, a touchpad, a mouse, trackball or touch screen. The value manipulated by the user is displayed in text field 850 (here throttle). The current numerical value is displayed in text field 875. Embodiments display the value in 875 in the units of voltage. Embodiments display the value in 875 as a percentage. In Mode B, Decoder 361 operates much like decoder 331 and mode B Encoder 367 operates much like Encoder 337. Symbols and packets are encoded, and decoded. Therefore Mode B receiver 375, Mode B Transmitter 380, Communication device 376, input 374, and output 372 operate largely as described. In this way supervisor module 326 receives data from mobile computing device 290 indicating the method of encoding to be used for bidirectional bus interface 322. Supervisor module 326 further determines that the encoding on bidirectional bus interface 322 should use legacy PWM signaling. The digital data within received packets from mobile computing device 290 within Mode B indicates a control value to be applied to device 310. Module 360, stores a current control value in storage 350. Module 360 arbitrates the use of bidirectional bus interface 322 to place send the control value to device 310 through port 321. Encoder 363 encodes the control value from storage 350 using legacy PWM signaling. Thus in some embodiments of apparatus 300, device 310 is a simple servo such as 220 having a simple PWM receiver, and no internal processor or storage. The deflection and application of the PWM servo control signal can be tested using a special test program within mobile computing device 290.

In embodiments of Mode B communication, supervisors 326 determine that bidirectional live-mode communication is enabled between device 310 and data link 320. In bidirectional live-mode a bidirectional data path (such as 1054 of FIG. 10) is normally held by encoder 363 in a logically high state, and control pulses are periodically encoded by encoder 363 by bringing the data path to a logically low state to encode a PWM signal between about 1 ms and 2 ms. Pulse frequency of the encoder 363 is controlled by processor 324 and is programmable by mobile computing device 290 so that it is adjustable between 25 Hz to 200 Hz. Mode B Transceiver 308 decodes pulse widths and applies the control value that is encoded in pulse width to the device 310, e.g. if the device is an ESC such as 230, the pulse is used to indicate throttle control input. After a PWM pulse is encoded by encoder 363, processor 324 returns the bidirectional data path (such as 1054 of FIG. 10) to a high impedance state, allowing a device 310 to encode data on the bidirectional line for a return channel of live-data from device 310.

Device 310 encodes live data in transceiver 308 using pulse position modulation (PPM). Following a detected rising edge received by module 308, a timer is started that waits a fixed period, such as 500 microseconds, and then after a variable period between 0 ms and 5 ms, a short pulse, or glitch is encoded by bringing the bidirectional data path (such as 1054 of FIG. 10) to a low value for a short period of time such as 10 us. The variable period of time after the waiting period and before the glitch is measured by the decoder 365, and used as an indication of live data received from device 310. A repeating frame of N different variables are successively encoded by device 310 allowing Decoder 365 to detect each internal variable of device 310. Each variable has a variable sequence number k indicating the position within a frame. For example, N=12 variables can be transmitted from a device 310 such as an ESC. The first variable sequence (k=1) does not send any pulse at all, to allow a reset of the frame, and to indicate that the next sequence is the beginning of encoded data. The next variable sequence (k=2) encodes a time of 1 ms to allow for calibration of time scale. The next variable sequence (k=3) encodes the battery voltage measured during Field Effect Transistor (FET) off time when at partial throttle. The next variable sequence (k=4) encodes a ripple voltage, which is the difference between battery voltage measured during FET on time and FET off time. The next variable sequence (k=5) indicates current measured at the ESC. The next variable sequence (k=6) indicates the control pulse received as measured by the ESC. The next variable sequence (k=7) indicates the ESC current output power percentage. The next variable sequence (k=8) indicates the current electrical RPM of the motor attached to the ESC. The next variable sequence (k=9) indicates the BEC Voltage, or the present voltage of the ESC's BEC. The next variable sequence (k=10) indicates the BEC Current, the present amount of current that is being provided by the ESC's BEC. The next variable sequence (k=11) is either temperature or a calibration value. When the ESC has a linear temperature sensor, this is encoded here. Otherwise, a 0.5 ms calibration pulse is encoded to permit the second value of a 2 point calibration. The next sequence (k=12) is either a temperature or a calibration value. When the ESC has a Negative Temperature Coefficient (NTC) temperature sensor, this is encoded here. Otherwise, a 0.5 ms calibration pulse is encoded to permit the second value of a 2 point calibration.

The decoder 365 decodes information received from the wired bidirectional digital data bus received through bidirectional bus interface 322. The decoder 365 identifies beginning of frame (k=1) by detecting a reset (no glitch). The decoder 365 then calibrates all values by taking the second sequence variable (k=2) as encoding a 1 ms pulse and the smaller of the $11^{th}$ and $12^{th}$ sequence variable (k=11 and k=12) as encoding a 0.5 ms pulse. The decoder 365 then measures a linearly encoded value between a minimum and a maximum allowed, and determines a linearly deflected value. If the temperature sensor is of the NTC type, logarithmic math is used to convert the linearly encoded value into a temperature according to the equation of the NTC sensor used. Embodiments perform the conversion of NTC type temperature data in mobile computing device 290. The decoder 365, after determining received values of variables, stores raw data in storage 350. The decoded values of digital data are also placed in a buffer area of storage 350 that is continuously updated when new digital data becomes available. Encoder 367 then encodes the data in symbols that are transmitted to mobile computing device 290 where they are received for example, by Mode B receiver 375 that operates in conjunction with communication device 376. In Mode B, Encoder 367 operates much like encoder 337 in terms of transmitted symbols encoded and packets encoded. However in Mode B, digital data represented and available within the live-data buffer in storage 350 is continuously transmitted to mobile computing device 290 to support a live-display of live-data within device 310. In embodiments, the mobile computing device 290 requests current live data and receives a response of current data from data link 320. Embodiments of mobile computing device 290 perform periodic requests, or back-to-back requests in a loop to provide current data for use or display at mobile computing device 290.

FIG. 8 presents an exemplary display 810 that is suitable for operational data such as live-data received by Mobile Computing Device 290. A number of operational data display areas such as 812, 814, 816, 818, 820 and 840 are dedicated to the presentation of current operational data. Areas such as 812, 814, 816, 818 or 820 provide radial deflection display areas as shown in detail in display area 820. An alternative to radial deflection is depicted in bar graph 840 that shows a visual analog in the shaded area which ends at 844 of the output power of the ESC. Text field 842 shows the title of operational data, e.g. "output power". Text field 870 shows the numerical value, for example, as a percentage.

Display area 820 illustrates a representative radial deflection display. A value label such as 822 indicates the operational data displayed such as RPM, Voltage, current, temperature, power, Output power. A numeric display field 824 indicates the current numerical value of the operational data (e.g. 100). A range field 836 gives a visual indication of the current value of the operational data, so that a needle deflection 826 indicates the current operational value within the range indicated by 836. Other display labels 828 and 830 indicate an associated parameter such as Min and Max respectively. Corresponding numerical fields 834 and 832 display the associated numerical values.

Turning again to FIG. 5, there is depicted in 500 an exemplary method operable on a data link 320 for communicating between a hobby device 310 and a mobile computing device 290. Supervisor module 326 determines at 510 the mode of operation for the data link. For example, Mode B is selected on command from mobile computing device 290. In Mode B, Mobile computing device 290 provides a user the opportunity to select live-data display tasks by selecting a device 310 to control and/or to test. Assume, for example that the device under test 310 is an ESC such as 230. Mode B module 360 proceeds to 520 where digital symbols received from analog input interface 354 are decoded to produce digital data comprising control input data to be transferred to device 310. At 530 the digital data such as a control value is stored for example in storage 350. At 540 embodiments of mode B module 360 encode digital data in a format compatible with the a bidirectional data bus, such as a PWM value that is placed on a bidirectional data path. Embodiments, after transmitting the encoded data, place a bidirectional data path in a high impedance state. The device 310 then receives and applies the control value and responds by sending an appropriate glitch that encodes data such as an operational alarm, or operational data such as a calibration value, a voltage, a ripple voltage, a current, a throttle level, output power, RPM, BEC Voltage, BEC Current or temperature. The glitch is decoded at 550 by module 360 to produce digital data that is stored at 560 in a buffer area of storage 350. At 570 module 360 encodes the digital data in a packet for transmission on analog output interface 352. At 580 a test is performed to determine if a new mode selection has been detected by supervisor 326. If the mode remains the same, then the method returns to 520 to continue mediating data transfers between Mobile computing device 290 and electronic component 310 under Mode B operation. Otherwise, if a mode change is indicated at 580, the method returns to 510 where the module for the new mode is activated. Embodiments of the method 500 skip encoding and decoding operations that are not needed, so that several transmissions in one direction take place in a row without a data transfer in the opposite direction. Embodiments pass data on more than one data path in parallel to decrease the total data transfer time.

The encoder 337 in conjunction with analog output interface 352 encodes symbols to form a packet that is received in conjunction with communication device 376 by Mode A Transceiver 370. Likewise, Mode A Transceiver 370 in conjunction with communication device 376 encodes symbols within a packet to be received by decoder 331 in conjunction with analog input interfaces 353 and 354. Similarly Mode B Transmitter 380 encodes symbols in conjunction with communication device 376 to be decoded by decoder 361 in conjunction with analog input interface 354. Mode B encoder 367 in conjunction with analog output interface 352 encodes symbols to be received by Mode B Receiver 375 in conjunction with communication device 376. Other embodiments use alternative or additional symbol encoding and corresponding decoding techniques such as DPSK, CPFSK, MFSK, ASK, OOK, MSK, QAM, CPM, PPM, TCM, OFDM, PCM, PAM, and PWM.

Turning now to FIG. 4, there is depicted in apparatus 400 detail for embodiments of a portion of FIG. 3. Transient Voltage Suppressors such as 412, 424, 434, and 444 protect devices such as mobile computing device 290, and hobby device 310. Bidirectional bus interface 322 includes a voltage interface that takes 5 volts supplied through line 321b of port 321 and derives, through 47 ohm resistor 401 and 4V zener diode 402 in conjunction with capacitors 403 and 404 of 0.1 microfarads and 1 microfarad respectively, the internal 4 volt supply voltage for the processor 324. Pullup 4.42 kilo-ohm resistor 410 is also connected to the 5 volt signal supplied in connector 321. The bidirectional data path 321a couples from the opposite end of resistor 410 through a 47 ohm resistor 411 to processor 324 to provide a bidirectional data path 450 to the processor 324. The bidirectional data path 321a further couples to ground through capacitor 413 of 0.1 microfarads. The bidirectional data path is driven with a totem-pole style driver circuit that is common to most microprocessors. The bidirectional data path 450 can be open-collector or push-pull. The ground input 321c from connector 321 couples to local ground. The pins of connector 321, such as pins 321a, 321b, and 321c, are replicated to port 323 in pins 323a, 323b, and 323c respectively within bidirectional bus interface 322. The 4 volt reference is used to set up a reference voltage for comparators 420 and 430 through two resistors 421 and 422 each of 12 kilo-ohms resistance. Pad 486 receives a left speaker signal input from jack 495 and couples through a circuit containing resistor 427 of 47 ohms, capacitor 426 of 0.1 microfarads, resistor 423 of 120 kilo-ohms, and resistor 425 of 120 kilo-ohms to provide the data signal input to comparator 420 of analog input interface 354. The output of comparator 420 is then supplied through input 461 to processor 324. Likewise, the pad 487 receives a right speaker signal input from jack 495 and couples through a circuit containing resistor 437 of 47 ohms, capacitor 436 of 0.1 microfarads, resistor 435 of 120 kilo-ohms and resistor 433 of 120 kilo-ohms to provide the data signal input to comparator 430 of analog input interface 353. The output of comparator 430 is then provided through input 462 to processor 324. An output 463 from processor 324 couples into analog output interface 352 which includes resistor 445 of 12 kilo-ohms resistor 447 of 392 kilo-ohms and capacitor 448 of 0.1 microfarads to pad 488 which couples to a microphone input line of jack 495. Transmission medium 356 as shown contains a four wire interface of 496 coupled to pad 486, wire 497 coupled to pad 487, wire 498 coupled to pad 488 and wire 499 which is coupled to pad 489, where pad 489 provides ground. The four wire interface shown in transmission medium 356 includes a TRRS jack 495. Alternatively a separate stereo speaker jack such as a Tip-Ring-Sleeve (TRS) jack could be coupled to a ground pad such as 489 together with left and right speaker signals on wire 496 and 497, while a second microphone audio jack couples to wire 498 and 499. Adapters can likewise be added to jack 495 to split the combined audio into separate microphone and stereo jacks, or to provide adapters to specialized connectors amenable to mobile computing device 290.

In embodiments comparators such as 420 and 430 have configurable hysteresis. A comparator is configured with a high level of hysteresis when an adjustable level is chosen to be at least half way through an adjustable range. In embodiments comparators such as 420 and 430 are configured with a high amount of hysteresis, so that relatively large perturbations about a reference value are needed to change the output voltage of the comparator. In some embodiments the inputs to comparators 420 and 430 are input into an integrated circuit having a crossbar switch that allows a single comparator to be time shared to perform the functions of two comparators. In embodiments processor 324, comparator 420, and a crossbar switch are all integrated into a single circuit such as silicon laboratories mixed signal MicroControl Unit Embodiments of analog input interface 354 or analog input interface 353 replace a comparator such as 420 or 430 with multi-bit analog to digital converters which then passes a multi-bit digital one or two channel output to processor 324. Embodiments of analog interface 354 perform counting or accumulation of digital samples from a symbol, and pass the result of an integrated symbol to processor 324. Embodiments of analog input interface such as 354 tie analog signals directly to digital input 461. Embodiments of analog input interface 354 comprise an intermediate frequency which makes use of bandpass sampling with an analog to digital converter. Embodiments of an intermediate frequency interface make use of in-phase and quadrature signal outputs to processor 324. Embodiments accomplish hysteresis by adding capacitance in parallel to resistors such as 425 and 435, and eliminate the need for comparators.

Embodiments of processor 324 include counters or accumulators that integrate several high speed digital samples to form an aggregate digital statistic that is used as a decision statistic to formulate a decision about the identity of a receive symbol. In embodiments of data link 320, processor 324 is replaced with a hardware only solution that performs the functions of processor 324 described herein. Representative hardware embodiments provide a digital logic replacement for processor 324 comprising at least one of a state machine, a microsequencer, a Programmable Logic Device (PLD), and a Field Programmable Gate Array (FPGA). Representative FPGA's include programmable flash memory or Electronically Erasable Programmable Read Only Memory (EEPROM). Representative FPGA's can be reprogrammed using a common programmable file format to store in flash or EEPROM a programmable Boolean logic pattern such as a JEDEC, Altera Programmable Object File, or Xilinx BITstream format. Embodiments of data link 320 incorporate hybrid integrated circuits having digital and analog circuits incorporated together on the same integrated circuit.

Figure 6:
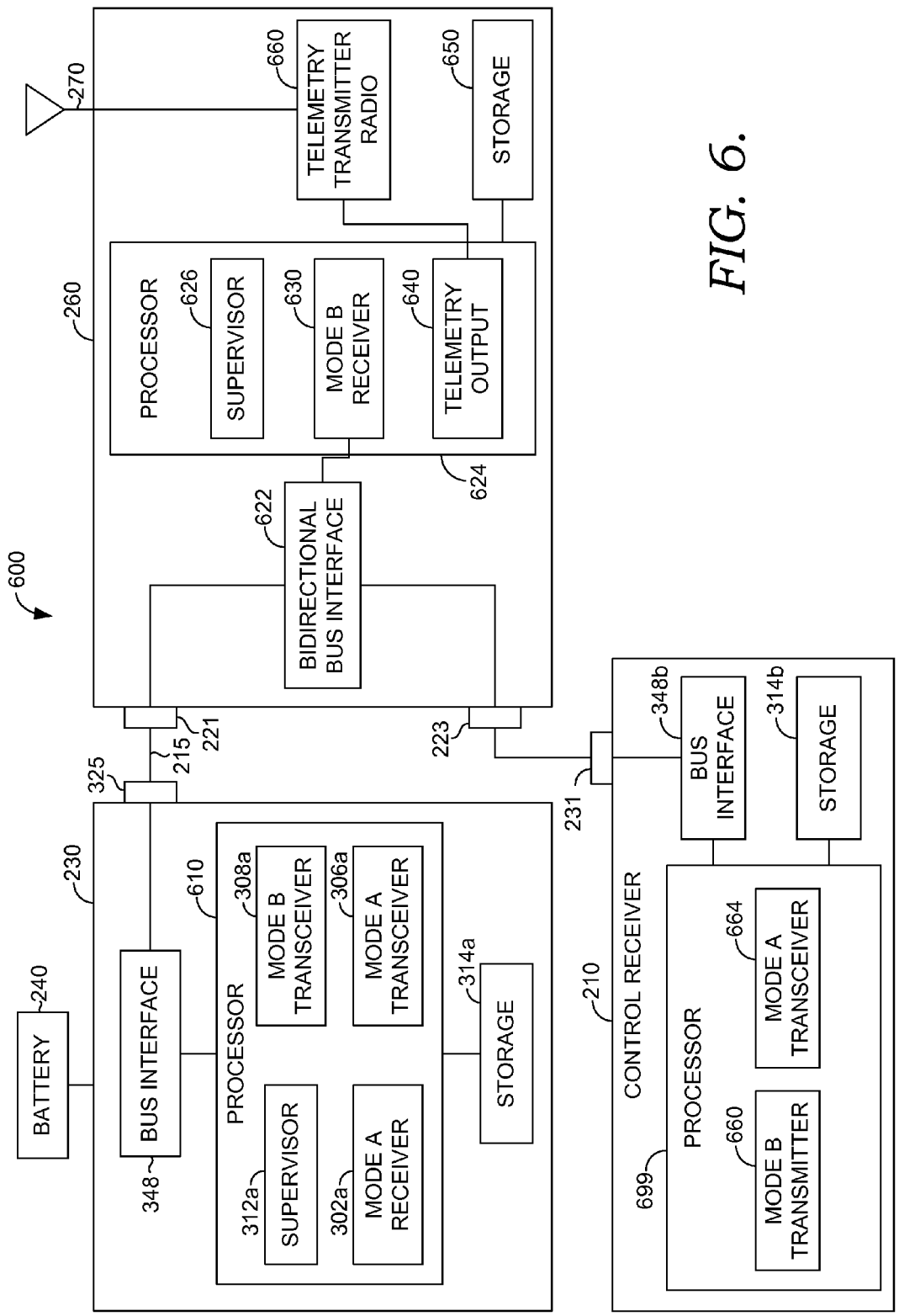
FIG. 6 is a block diagram of an apparatus showing exemplary detail of an electronic speed controller, a control receiver and a Telemetry Transmitter in accordance with embodiments of the present invention.

Turning now to FIG. 6, there is depicted in 600 a block diagram of an apparatus showing exemplary detail of certain aspects of a portion of FIG. 2. The devices 240, 230, 210, and 260 are operating in-use to provide live data to be transmitted out of antenna 270. To prepare for this configuration, device 210 is previously programmed with firmware settings in storage 314*b* so that processor 699 operates by generating 1 to 2 ms PWM control pulses with polarity opposite to the standard over connector 231. This programming could occur, for example, by making use of Mode A transceiver 664 in conjunction with the apparatus of FIG. 3. Therefore, in the present configuration, control receiver 210 makes use of a Mode B Transmitter 660 so that the bi-directional data path is driven in a normally high fashion, with low pulses of variable width from 1 to 2 ms occurring every 20 ms. Control pulses come from processor 699 and pass through bus interface 348*b* which is of identical construction to bus interface 348. The data travels from port 231 to port 223 on Telemetry transmitter 260 into bidirectional bus interface 622. The bidirectional bus interface 622 is identical in construction to interface 322 of FIG. 4. Therefore the bidirectional data path carries data out port 221 over cable 215 to connector 325 and to bus interface 348 and therefore to processor 610. Embodiments use a conventional, legacy control receiver 210, and perform data inversion in bidirectional bus interface 622 in order to provide live mode data without requiring a control receiver 210 that has unconventional signal levels.

Supervisor 312*a* determines that ESC 230 should be operating in Mode B as a transceiver, and therefore activates module 308*a*. The software for the Mode B transceiver could have been programmed in a prior session making use of the apparatus of FIG. 3, and activating module 306*a* to perform reprogramming. Note that device 230 is also a operable in another mode to use Mode A Receiver 302*a* which operates similarly to module 302. After the activation of module 308*a* in the present session, processor 610 records operational data in storage 314*a*. Module 308*a* receives control pulses and applies them to the motor within the vehicle, and also encodes operational data using pulse position encoding of the bidirectional wire within cable 215, following a twelve position frame as described elsewhere. Telemetry transmitter 260 determines within supervisor 626 that the current mode of operation of processor 624 is to read the bidirectional data path passively, and to send live data over a telemetry link, and therefore processor 624 activates Mode B receiver 630. Processor 624 decodes the values of the operational data in Mode B Receiver 630 and stores the values in storage 650. Telemetry output module 640 encodes digital data in telemetry transmitter radio 660 and sends operational data out over antenna 270. Embodiments of Radio 660 and Radio 705 are half-duplex or full duplex spread spectrum radios. Embodiments of spread spectrum radios use frequency hopping, time hopping, direct sequence spread spectrum techniques. Embodiments operate at lower power without spread spectrum modulation according to the regulations of unlicensed frequency usage. Embodiments of spread spectrum radios operate at about 900 MHz, 2.4 GHz, or 5.8 GHz carrier frequencies.

Embodiments of Bidirectional bus interface 622 receive from bus interface 348*b* conventional legacy control signals wherein a bidirectional data path is normally low, and encodes 1 ms to 2 ms control pulses with high logic values. Bidirectional bus interface 622 therefore buffers and inverts the bidirectional data path received from connector 231 and provides an inverted signal over cable 215 to ESC 230. In this manner, control receiver 210 uses conventional signaling, and does not need to be specially configured. Furthermore, embodiments of bidirectional bus interface 622 isolate the data path on port 223 so that the port 231 is not affected by pulse position modulation information placed by ESC 230 on cable 215.

Turning now to FIG. 7, there is depicted in 700 a block diagram of an apparatus showing exemplary detail of certain aspects of a portion of FIG. 2. Telemetry receiver 280 is powered by an internal battery. Antenna 275 receives the radio signal in telemetry receive radio 705 which demodulates the operational data and sends it to processor 710. Processor 710 receives the data using telemetry input module 720 and stores the data in storage 730. Supervisor 715 has previously determined that it would be operating in a live-data mode, and so had activated module 725 to exchange data with mobile computing device 290. Embodiments of Module 725 read data from storage 730 and encode the data in packets made up of symbols for transmission over interface 740. Module 725 is identical in construction and operation to module 360. In embodiments interface 740 is identical in construction to interface 352, interface 735 is identical in construction to interface 354, transmission medium 745 is identical in construction with transmission medium 356 of FIG. 4, analog output 750 is identical in construction with output 372, analog input 755 is identical in construction with input 374, and communication device 760 is identical in construction with communication device 376. Processor 710 receives commands from mobile computing device 290 over analog input interface 735. Processor 765 has previously determined in supervisor 787 that a live-data mode is desired by the user, and so module 775 has been previously activated. Module 775 receives the current values of operational data and stores values in storage 790. Module 775 also retrieves current values of operational data and displays on display 780, for example in a display window 810 shown in FIG. 8. In other embodiments the operational display includes an alarm, or operational statistics. Note that in some scenarios the user indicates a desire to reprogram or change the configuration of telemetry receiver 280, and module 770 is activated for this purpose.

Embodiments of Telemetry transmitter radio 660 include an alarm transmitter radio that reports to Telemetry Receive radio 705 operational data from device 230 indicative of an alarm condition. In such an alarm application a software module such as those shown in FIG. 3, FIG. 6, or FIG. 7 performs a comparison of an alarm value with an alarm threshold and determines an alarm condition. Embodiments of the alarm comparison occur in a module of the mobile computing device 290 such as module 775. Embodiments of the alarm comparison occur in a module of the Telemetry Receiver 280 such as module 725. Embodiments of the alarm comparison occur in a module of the Telemetry Transmitter 260 such as module 630, 626, or 640. Embodiments of the alarm comparison occur in a module of an ESC 230 such as module 308a. Embodiments of the alarm comparison occur in a module of the hobby device 310 such as module 308. Embodiments of the alarm comparison occur in a module of the data link device such as module 360.

Turning now to FIG. 9, there is shown an exemplary computer device 900 that has software instructions for storage of data and programs in computer readable media. Computer device 900 is representative of a system architecture that could be used for user devices such as 290. CPU's such as 901 have internal memory for storage and couple to the North Bridge device 902, allowing CPU 901 to store instructions and data elements in system memory 915, or memory associated with graphics card 910 which is coupled to display 911. Bios flash ROM 940 couples to North Bridge device 902. South bridge device 903 connects to north Bridge device 902 allowing CPU 901 to store instructions and data elements in disk storage 931 such as a fixed disk or USB disk, or to make use of network 933 for remote storage. User 10 device 932 such as a communication device, a mouse, a touch screen, a joystick, a touch stick, a trackball, or keyboard, couples to CPU through South Bridge 903 as well.

Figure 11:
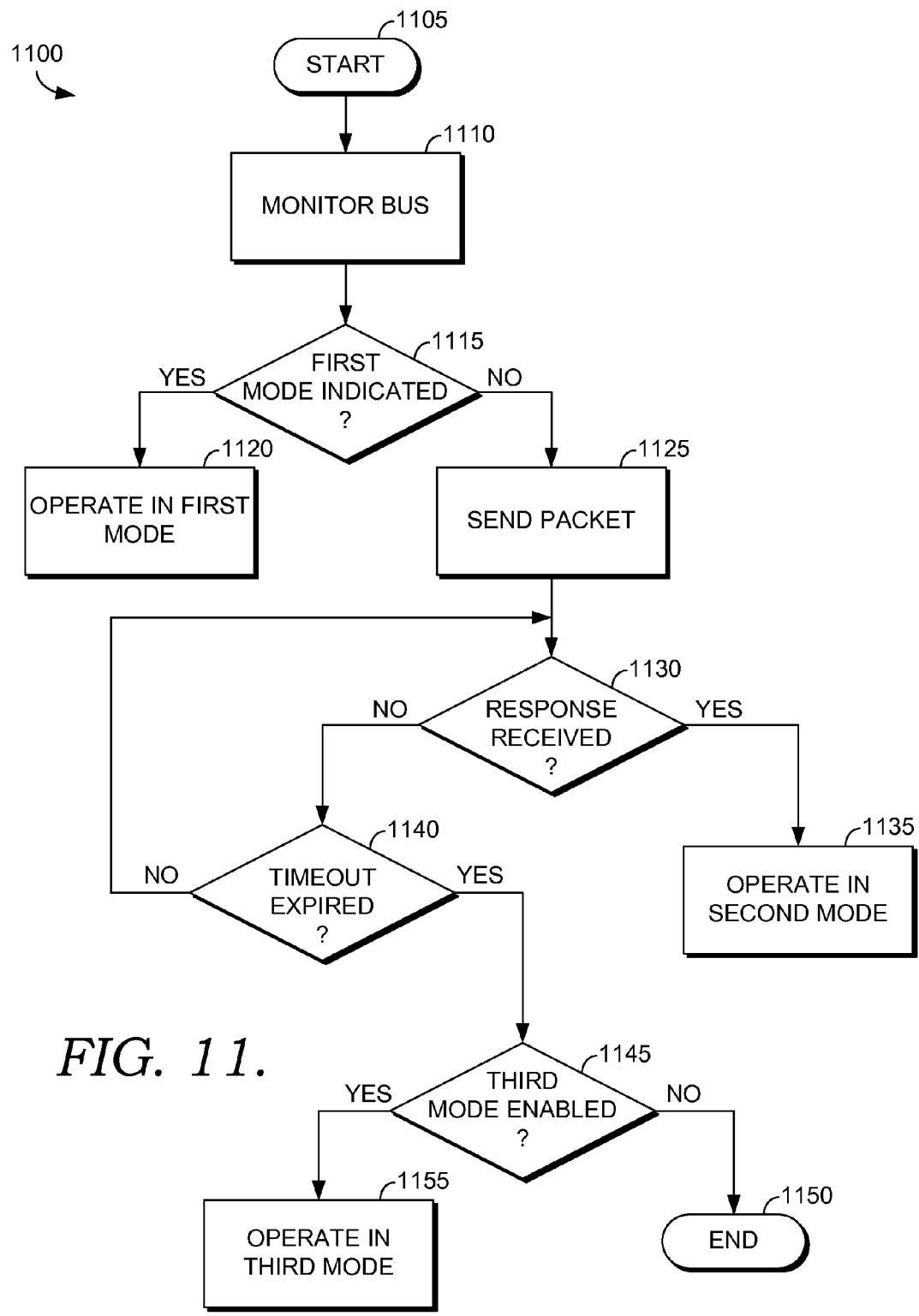
FIG. 11 is an exemplary flow diagram of a method performed within an electronic component for selecting an operating mode establishing a communication framework in accordance with an embodiment of the present invention.

Turning now to FIG. 11, there is shown in 1100 an exemplary method within an electronic component for selecting an operating mode which establishes a communication framework. At 1105 the method begins executing, for example, upon power up. A supervisor module such as 312 begins a procedure to determine the operating mode of a device 310. At 1110 the bidirectional data path is monitored. At 1115, if the voltage is low for long periods of time, indicating a legacy PWM control mode then the method proceeds to 1120 at which point the device continues to receive 1 to 2 ms control pulses every 10 ms to 20 ms, and these pulses are applied by the device such as 310 until the mode selection procedure is restarted, for example on power up. Returning to 1115, If the voltage on the bidirectional data path is high for long periods of time, then the method proceeds to 1125 where a Mode A start or connect packet is encoded in and sent on the bidirectional data path. The method proceeds to 1130 where the method looks for a response, if none is found then the method proceeds to 1140 where a check is made to see if a timeout has expired. If the timeout has not occurred yet, then the method returns to 1130. If a response is received at 1130 the method proceeds to 1135 where Mode A exchange mode is entered. Returning to 1140, if a timeout occurs before a valid response is received, the method proceeds to 1145 where a storage location is checked to see if a live-data mode is enabled. If the live-data mode is not enabled, then the method proceeds to 1150 and comes to an end. Otherwise, at 1145 if the live-data mode is enabled then the method proceeds to 1155 where Mode B operation proceeds. At 1155 control data is received by device 310 and operational data is encoded in pulse position modulation format as described herein.

Turning now to FIG. 12 there is shown in 1200 a method for a supervisor such as 378 to determine which mode of operation to enter. At 1205 the supervisor 378 receives a user input indication of the mode that the user would like to operate. At 1210 a decision is made as to which mode is selected by the user. If Mode A is selected, the method proceeds to 1215 where a display screen is presented to the user presenting a number of programming options for the user to retrieve or change values of storage 314 in a connected device 310. At 1220 a data exchange task is selected and the method proceeds to 1225 where the selected task is carried out. At 1230 after the task is complete, the results of the command if any are returned, and a display is presented to the user on display 911 indicating completion of the task. At 1235 a test is performed to determine if a new mode has been selected. If a new mode is selected the method returns to 1210 to enter the selected mode. If a new mode is not selected, then the method returns to 1215 allowing the user to be presented with additional task options. Returning to 1210 if Mode B had been selected by the user, then the method proceeds to 1240 where a control such as marker 865 relative to slider 855 is sampled to determine a current control selection by the user. The method proceeds to 1245 where the current control selection is sent to device 310. At 1250 the method receives operational data and at 1255 the operational data is displayed. A representative display of operational data is shown, for example display 810 of FIG. 8. At 1260 a test is performed to determine if a new mode has been selected. If a new mode is selected then method returns to 1210 to enter the selected mode. If a new mode is not selected, then the method returns to 1240 where a new sample of the control selection is made by the user.

Alternative embodiments and implementations of the present invention will become apparent to those skilled in the art to which it pertains upon review of the specification, including the drawing figures. The specific features and methodological acts are disclosed as example forms of implementing the claims. Accordingly, the scope of the present invention is defined by the appended claims rather than the foregoing description. Further, the use of plural is not necessarily intended to imply multiple. For readability, plural (and vice versa as to singular) is sometimes used when, in fact, a single instance of a thing is contemplated.

The invention claimed is:

1. An apparatus for supporting communication between a mobile computing device and an electronic component operable within a remote control vehicle, said apparatus comprising:
   a first analog input interface coupleable to a first analog output of a mobile computing device;
   a first analog output interface coupleable to a first analog input of said mobile computing device;
   a bidirectional wired bus interface coupleable to an electronic component, wherein said electronic component is operable within a remote control vehicle;
   a wired cable coupled to said first analog input interface and to said first analog output interface, wherein said wired cable terminates in at least one audio jack connector comprising a tip, a ring, and a sleeve; and a microprocessor coupled to said first analog input interface, said first analog output interface, and said bidirectional wired bus interface, wherein said microprocessor is configured in a first mode to:

(A) decode a first set of digital symbols received from said first analog input interface, thereby resulting in first digital data that includes parameters associated with said electronic component;

(B) store said first digital data, (C) encode said first digital data in a format compatible with said bidirectional wired bus interface, (D) decode information received from said bidirectional wired bus interface to produce second digital data, and (E) encode a second set of digital symbols representing said second digital data for transmission on said first analog output interface.

2. The apparatus of claim 1, wherein said bidirectional wired bus interface comprises a single bidirectional data path, and wherein said microprocessor is configured to arbitrate data flow on said single bidirectional data path.

3. The apparatus of claim 2, wherein said microprocessor is configured to place said single bidirectional data path in a high impedance state when said microprocessor is not encoding data on said single bidirectional data path.

4. The apparatus of claim 1, wherein said electronic component is coupled through a cable to said bidirectional wired bus interface, wherein said electronic component is an electronic speed controller coupleable to a battery and a motor, and wherein said electronic speed controller comprises a microprocessor configured to apply power received from the battery to said motor by controlling timing and duration of voltage pulses provided to said motor.

5. The apparatus of claim 1, wherein said first analog input interface comprises a comparator configured to compare a voltage derived from said first analog output of said mobile computing device to a reference and to provide the result of said comparison to said microprocessor, and wherein said microprocessor and said comparator are comprised within the same integrated circuit.

6. The apparatus of claim 5, wherein said comparator is configured to have a high amount of hysteresis.

7. The apparatus of claim 1, further comprising a second analog input interface coupleable to a second analog output of said mobile computing device.

8. The apparatus of claim 1, wherein said electronic component is one of a telemetry transmitter, a telemetry receiver, a hobby control receiver, a hobby alarm transmitter, and a hobby alarm receiver.

9. The apparatus of claim 1, wherein said parameters associated with said electronic component comprise at least one of an alarm setting, a control setting, an operational variable setting, and firmware data.

10. The apparatus of claim 1, wherein said information comprises data associated with said electronic component, and wherein said information comprises at least one of a current alarm setting, a current operational variable setting, data log values, an alarm, an operational measurement, and an operational statistic.

11. The apparatus of claim 1, wherein said first digital data comprises a control setting, and wherein said format compatible with said bidirectional wired bus interface is a pulse width modulation format.

12. The apparatus of claim 1, wherein said information received from said bidirectional wired bus interface is decoded using a pulse position measurement technique.

* * * * *